(12) United States Patent
Croushore et al.

(10) Patent No.: US 6,278,357 B1
(45) Date of Patent: Aug. 21, 2001

(54) APPARATUS AND METHOD FOR IMPLEMENTING DIGITAL COMMUNICATIONS ON A POWER LINE

(75) Inventors: Timothy M. Croushore; William C. Guyker, both of Greensburg, PA (US); Walter M. Curt, Harrisonburg, VA (US); Glen K. Shomo, III, Harrisonburg, VA (US); Chris F. Mullins, Harrisburg, VA (US); James M. Childers, IV, Yorktown, VA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 09/497,470

(22) Filed: Feb. 3, 2000

Related U.S. Application Data

(60) Provisional application No. 60/118,647, filed on Feb. 4, 1999.

(51) Int. Cl.[7] ................................................. H04M 11/04
(52) U.S. Cl. .................. 340/310.01; 340/534; 340/538; 340/310.01; 340/310.02
(58) Field of Search ..................................... 340/533, 534, 340/537, 538, 310.01, 310.02

(56) References Cited

U.S. PATENT DOCUMENTS 4,755,792 * 7/1988 Pezzolo et al. ...................... 340/538

* cited by examiner

Primary Examiner—Daryl Pope
(74) Attorney, Agent, or Firm—Pennie & Edmonds LLP

(57) ABSTRACT

An apparatus to establish bi-directional digital communication over a power line network includes a signal launching circuit to impose a digital communication signal onto a power signal carried by a power line network and thereby form a digital communication power signal at a first point in the power line network. The signal launching circuit is configured to position a pulse of the digital communication signal at any phase location of each half cycle of the power signal. A receiver reads the digital communication power signal at a second point in the power line network. A signal processor is connected to the receiver to recover the digital communication signal from the digital communication power signal.

20 Claims, 24 Drawing Sheets

APPARATUS AND METHOD FOR IMPLEMENTING DIGITAL COMMUNICATIONS ON A POWER LINE

This application claims priority to the provisional patent application entitled "Digital Distribution Powerline Communication System", Serial No. 60/118,647, filed Feb. 4, 1999.

BRIEF DESCRIPTION OF THE INVENTION

This invention relates generally to the utilization of electrical utility power lines. More particularly, this invention relates to a technique for transmitting and receiving digital information within an electric utility power line network.

BACKGROUND OF THE INVENTION

Power line networks interconnect practically every home and business in the United States. It would be highly desirable to utilize this established infrastructure to deliver digital information. A system of passing digital information over power line networks could be exploited in a large number of ways, including: remote meter reading, load control, status checks on switches and related electrical equipment, telemetry, and the like.

Prior art attempts to implement digital communications over power line networks have met with limited success. One problem with prior art systems is that they have relatively low data rates. In many systems, this problem is attributable to the fact that digital information can only be placed at limited locations on a carrier power signal. Another problem with prior art systems is that they can only send information in one direction. For example, some systems can only push information "upstream" from a distribution location to a substation location, but cannot pass information "downstream" from a substation location to a distribution location. Thus, bi-directional communication is not possible. Another problem with prior art systems is that they require the installation of supplemental, specialized equipment on the power line network. Examples of such equipment include signal repeaters and capacitor blocking reactors.

In view of the foregoing, it would be highly desirable to provide an improved system for implementing digital communications in a power line network.

SUMMARY OF THE INVENTION

The apparatus of the invention establishes bi-directional digital communication over a power line network. The apparatus includes a signal launching circuit to impose a digital communication signal onto a power signal carried by a power line network and thereby form a digital communication power signal at a first point in the power line network. The signal launching circuit is configured to position a pulse of the digital communication signal at any phase location of each half cycle of the power signal. A receiver reads the digital communication power signal at a second point in the power line network. A signal processor is connected to the receiver to recover the digital communication signal from the digital communication power signal.

The method of the invention includes the step of imposing a digital communication signal onto a power signal carried by a power line network and thereby forming a digital communication power signal at a first point in the power line network. The imposing step includes the step of selectively positioning a pulse of the digital communication signal at any phase location of each half cycle of the power signal. At a second point in the power line network, the digital communication signal is recovered from the digital communication power signal.

The invention successfully operates on existing distribution system wiring, without requiring the installation of signal repeaters or reactive coupling or blocking devices. The invention provides a bi-directional communication system that is relatively low cost from an installation and maintenance perspective. The communication equipment and protocol associated with the invention are under complete cost and operating control of electric utility personnel. The invention obviates the need to provide broadband technologies for low bandwidth applications, such as automatic meter reading, distribution automation, and home security. This bi-directional communication system provides a highly functional, secure, and reliable path to an electric utility customer.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
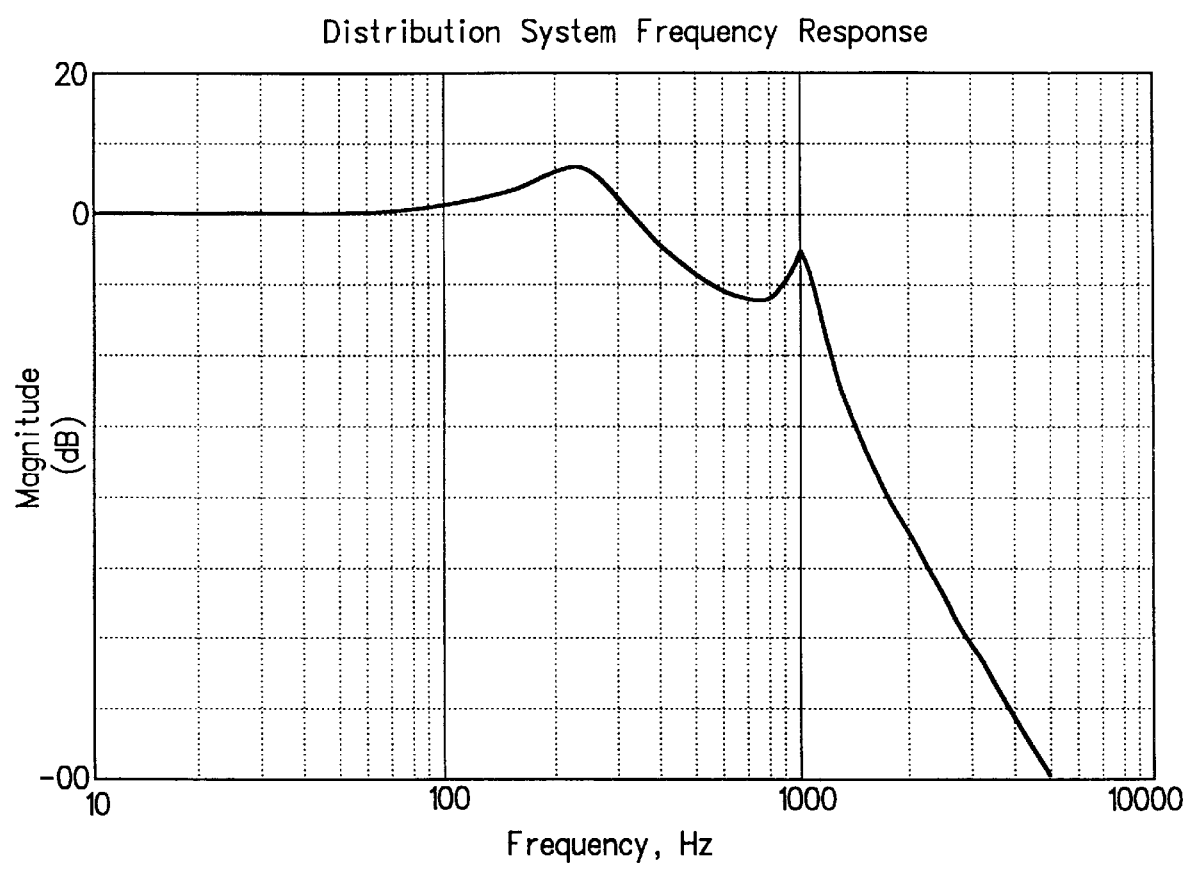
FIG. 1 is a plot of the distribution system frequency response measured as current recovered at a substation phase current monitoring current transformer relative to the current injected at a remote node distribution transformer.

FIG. 1 is a general representation of a phase current transfer function frequency response for one of six remote sites tested in a power line network (also referred to herein as a distribution system). The graph response amplitude is normalized to 60 Hz, indicated as 0 dB of loss on the graph. The frequency response shown in FIG. 1 indicates a lowpass filter behavior with a generally flat and un-attenuated response up to the first major system resonance at about 250 Hz. Most distribution systems have a first resonant frequency of approximately 200–500 Hz. This is primarily due to the resonance of the total system inductance and capacitance. The total inductance is formed by the substation transformer inductance in parallel with the system load inductance. The capacitance is formed by the parallel combination of any power factor correction capacitors present in the distribution system feeder circuit, and the distribution line capacitance. The resulting resonant frequency is where the total inductive and capacitive elements have the same impedance, at 250 Hz in the FIG. 1 graph. The response peaks up at this resonance point, typically about 4–7 dB, and then falls off at approximately a 20–24 dB per octave rate. An example of other additional higher Q system secondary resonances can be seen starting at about 1 KHz. Above 1 KHz the response falls off more rapidly.

The technique of the invention injects, propagates, and recovers data bits in the electric utility distribution system, directly in the frequency spectrum of the baseband data bit stream. Utilizing a straightforward method called ON-OFF Signaling or Keying, a distribution system perturbation (disturbance) is generated for the transmission of a logic 1 data bit, and the absence of a perturbation represents a logic 0 data bit. Data bits are generated and injected into the distribution system in a manner that places most of the data bit energy within the frequency spectrum shown in FIG. 1. By producing distribution system voltage perturbations, for substation to remote node site communication, or current perturbations, for remote node site to substation communication, successful data communication can be achieved using the same frequency spectrum occupied by the distribution system's 60 Hz power frequency, harmonics, and noise.

As indicated in the graph of FIG. 1, signals in the frequency band up to the first system resonance of approximately 250 Hz will be propagated through the distribution system with little or no attenuation. Signals in the frequency band from 250 Hz to approximately 1 KHz will be propagated through the system with a moderate amount of attenuation. Field tests indicate that data signals (or baud rates) of up to a few kilohertz may be utilized in accordance with the invention. As discussed above, signals with frequencies up to a few kilohertz experience moderate attenuation when propagated through the distribution system. Although this attenuation is more severe above the first system resonance (200–500 Hz), signals above this frequency can still be recovered if correctly processed. However, as in most communication systems, the quality of the signal detected at a receiver location is dependent on the noise level present at the receiver input as well as the absolute signal level. In the system of the invention, inbound communications (from remote node site to the substation) are received at the substation by detecting the current flow in a phase current monitoring current transformer. Since the current in this current transformer is a combination of all load currents supplied on that phase, it is an inherently noisy environment in which to detect communication signals. All current components related to the 60 Hz power line frequency are called synchronous components. This includes harmonics, which occur at multiples of the 60 Hz frequency. All other current components not directly related in time or phase to the power line frequency are called non-synchronous noise components.

The current waveform, as detected at the substation current transformer secondary, contains power frequency spectral lines, generally following the shape of the current transfer function shown in FIG. 1. This current waveform contains power frequency spectral lines (frequency components), spaced at 60 Hz intervals —60 Hz, 120 Hz, 180 Hz, etc. The amplitude of the 60 Hz fundamental frequency and its odd harmonics (3, 5, 7, etc. times 60 Hz) are typically more than 50 db above the noise floor. Since these levels are significantly higher than any transmitted data signals, they must be removed in the digital receiver to allow successful data recovery.

The non-synchronous noise spectrum seen at the substation current transformer results from a combination of two effects. First, the noise generated at customer sites has a spectral shape of its own. Second, this noise propagates through the distribution system just as the transmitted data signal does, and is affected by the distribution system current transfer function. Thus, the composite noise observed at the phase current monitoring transformer is the original source noise combined with the system transfer function.

Analysis of the phase current field test data revealed the typical relative amplitudes of synchronous to non-synchronous noise. The overall RMS value of non-synchronous noise was recorded as 1 to 3 A RMS (referred to the 7200 volt primary distribution side), embedded in 500 A RMS of 60 Hz (and harmonic) current. This range of noise was recorded during different times of day, on several different phase current monitoring transformers. The noise amplitude appears to decay roughly as 1/f, where f is frequency. This is characteristic of many natural noise phenomena which are produced by a random point process. In this case, the point process is the random switching on and off of loads in the system, such as air conditioners, heaters, etc.

Other non-synchronous sources such as motor starts can add to this noise. A primary system resonance (200–500 Hz) typically exists in the noise spectrum, as indicated by a broad peak in the noise spectrum at this frequency. As discussed above, modeling this resonance so that its effects can be canceled in the digital receiver filter process reduces the overall non-synchronous noise level, and helps cancel its effects on transmitted pulses.

Figure 2:
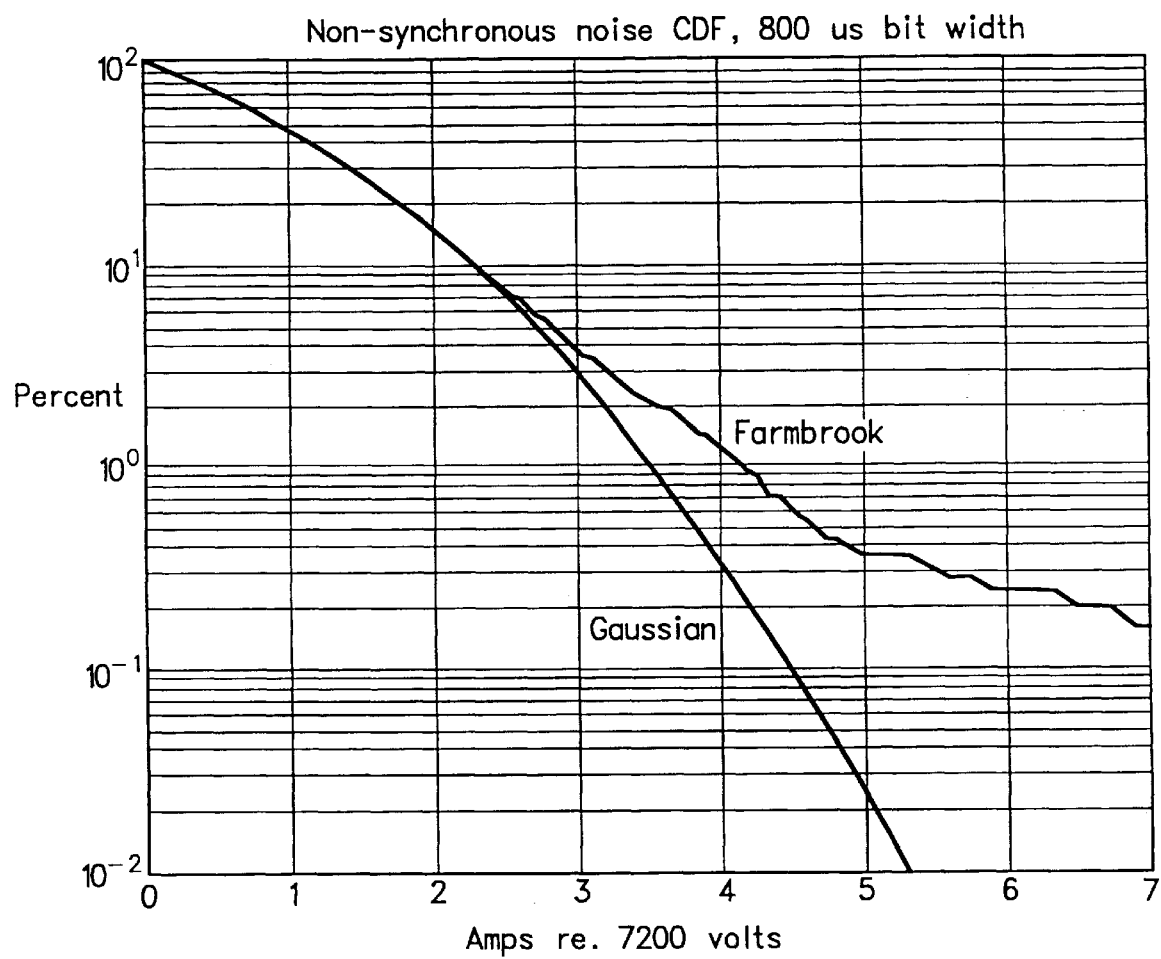
FIG. 2 is a plot of the cumulative distribution function of the non-synchronous noise measured in a distribution system phase current monitoring current transformer.

Noise amplitude peak to peak values as high as 10 A were also recorded, greatly exceeding the normal RMS noise value. This effect is typically caused by large loads switching, or motors starting. The exact effects of this type of noise on data communications depends on the magnitude of the impulse noise, the width of the impulse noise, and the width of the data bit. To further study the distribution system noise characteristics, cumulative distribution plots were generated, as a function of data pulse width. The cumulative distribution function (CDF) is the percentage of occurrences that the noise energy, for a given pulse width, exceeds a given current value. One such CDF plot is shown in FIG. 2, which assumes a data pulse width of 800 us. This graph includes a plot of actual phase current CT noise recorded in a distribution system, labeled Farmbrook, and a plot of ideal Gaussian noise. To correctly detect a data pulse, the data pulse must be greater than the corresponding noise most of the time. The amount of time actually required is a function of the desired bit error rate (BER). For example, assume a BER of 1% is needed (i.e. one out of one hundred bits would be received incorrectly). FIG. 2 is used to determine the required data pulse amplitude for this BER in the example for the Farmbrook circuit. To do this a line is extended from the 1% point on the y-axis, horizontally across to the intersection with the Farmbrook curve. Dropping down from this point to the x-axis, observe that the noise for this pulse width is 4.2 A or lower 99% of the time. Thus, if a pulse level of 4.2 A on the 7200 V primary side (30×4.2=130 A on the distribution transformer, DT, secondary side) is used for data transmission, the noise will be larger than the pulse only 1% of the time. This CDF is directly dependent on the actual noise level in the system, which typically varies from 1 to 3 A RMS for the Farmbrook distribution circuit.

Also plotted in FIG. 2 is the cumulative distribution function of ideal Gaussian noise. Note that the actual data curve begins to depart from the ideal curve at about 3 A. This indicates that there are infrequent, but high level bursts of noise. For example, 0.2% of the time, the noise current exceeded 6.5 A. The point of departure from the ideal curve is where increasing pulse current does not substantially decrease the error rate. In FIG. 2 it can be seen that the actual noise curve departs radically from the ideal curve above about 5 A. For this reason, a maximum remote node data transmitter pulse current level of 150 A was chosen. This is calculated from the 5 A distribution system primary side current, multiplied by the DT ratio of 30, resulting in the required DT secondary side current.

Because of this departure from the ideal curve, the actual time series data was examined to find the cause of the infrequent but large noise bursts. From an examination of the time series, it was seen that about once a second an impulsive noise burst of 6 A or greater occurs. Since this impulsive noise cannot be eliminated, the errors it causes must be tolerated for any realistic pulse current.

In the following discussions, outbound communication is defined as data transmission from a substation transmitter to any remote node location in the distribution system. Inbound communications is defined as data transmission from any remote node location within the distribution system to the substation data receiver equipment. Data communications can be independently and simultaneously conducted on each of the three voltage phases for any existing distribution feeder system supplied by a substation transformer.

Figure 3:
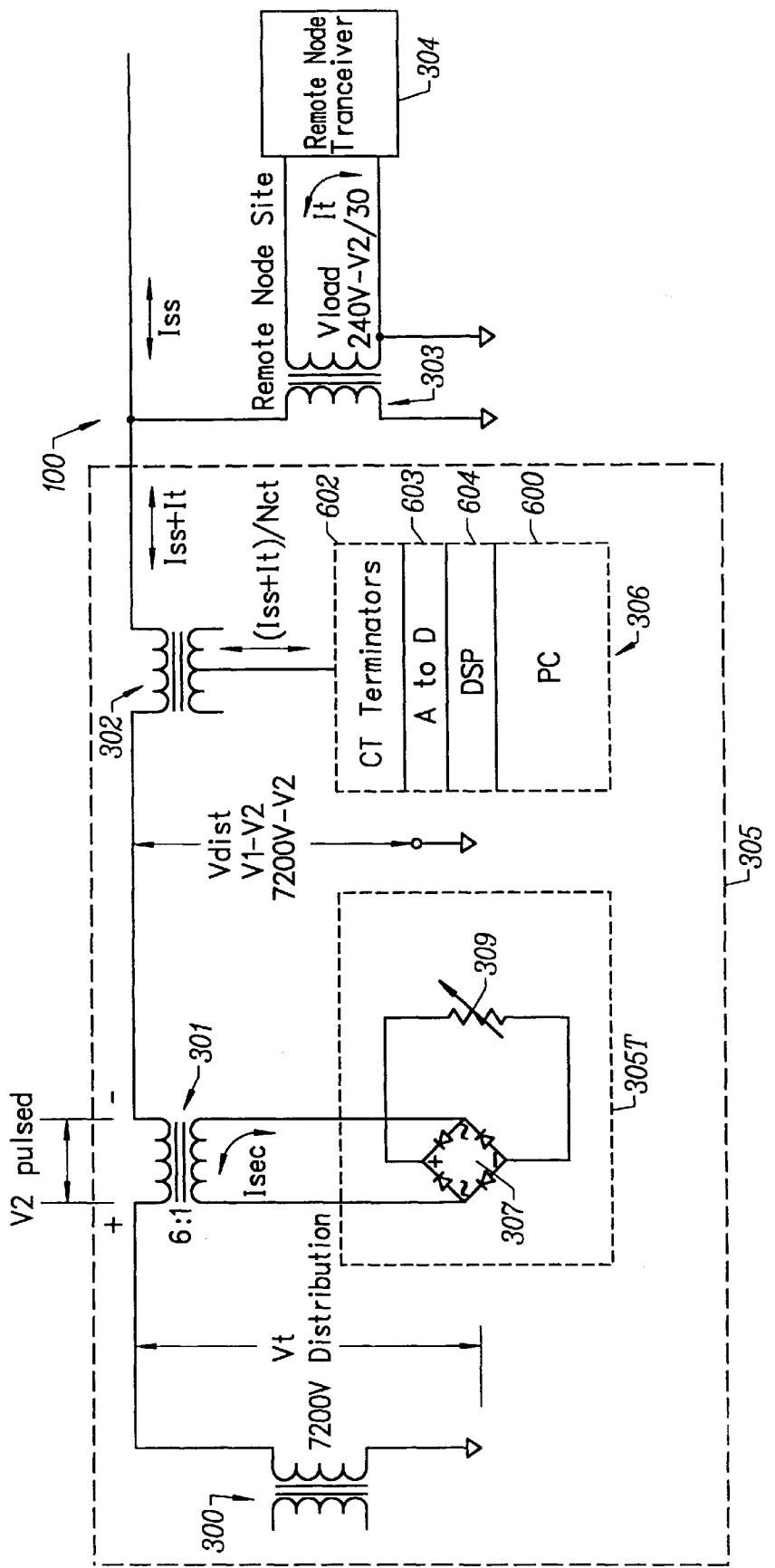
FIG. 3 illustrates a signal launching circuit in the form of a substation transmitter injecting a signal into one phase of a power line network in accordance with an embodiment of the invention.

FIG. 3 is a block diagram illustrating a component of the invention interfacing to a distribution system for bi-directional data communication. Outbound data bits transmitted on an individual distribution voltage phase are injected into the distribution system 100 through a signal launching circuit 305 (a substation transmitter in this case), which is connected to a signal injection current transformer 301. The outbound data bits appear as low amplitude voltage perturbations on the 7200 V distribution system phase voltage waveform. A data logic 1 bit produces a voltage change on the phase voltage, and a data logic 0 bit produces no voltage change. Since this phase voltage is supplied to all distribution system feeder circuits, operating from a given transformer bank 300, the outbound data signal is therefore available at all distribution transformers 303 on this voltage phase. For a data logic 1 bit, an outbound data signal voltage V1 is produced by the substation transmitter 305 in a pulse generation section 309 for the duration of the data bit. The outbound data signal voltage V1 can be viewed as a "perturbation" event, which is equivalent to an information bit, which is equivalent to a transmitted data bit. The bit duration or width is equal to 1/(baud rate). Thus, for a baud rate of 1260 baud, the bit width is 1/1260 or 793.7 us. For the purposes of discussion, a data logic 1 bit is referred to as the data signal, since a transmitted voltage or current is only generated for a logic 1 bit. The absence of a data voltage or current is interpreted in the data receiver as a logic 0 bit.

The AC rectification circuit 307 in FIG. 3 allows the generation of data signal pulses to be generated in each half cycle of the 60 Hz distribution system current waveform. Data signal voltage V1 appears across the secondary side of the signal injection current transformer 301, which is in series with the voltage Vt supplied by the substation transformer 300. This method of outbound data signal injection is thus called the series injection method. The data signal V1 is created by varying an impedance 309 on the DC side of the 307 bridge rectifier. By changing the impedance connected to the bridge rectifier, a desired data voltage V1 is created across the bridge rectifier and the secondary side of the signal injection CT 301. This voltage in the secondary of signaling CT 301 is transformed to the primary as V2 pulsed. Since this data voltage V2 is always subtracted from the distribution system voltage through the series injection process, the resulting composite distribution system voltage, supplied to all loads and devices connected to this distribution system phase voltage, is Vt−V2, or 7200 Vrms−V2. Data transmission voltage amplitude V2 is injected at a very low level with respect to the normal 7200 Vrms distribution phase voltage. The amplitude of the V2 data signaling voltage is maintained at about $\frac{1}{87}^{th}$, of the 7200 Vrms distribution phase voltage, or 83 Vpeak. This very low level distribution phase voltage perturbation is lower than normal voltage fluctuations that occur, and are allowed, in an electric utility distribution system.

This data modified phase voltage Vt−V2, in FIG. 3, is applied to a remote node distribution transformer 303. This voltage appears in the 7200 V/240 V DT secondary at $\frac{1}{30}^{th}$ of the primary amplitude, or a nominal voltage of 240 Vrms–(V2/30), and is applied to the remote node data transceiver 304. Data is recovered in the receiver of the remote node data transceiver 304 through application of the digital signal processing techniques of the invention, which are discussed below. Special signal recovery methods associated with the invention allow the low level outbound data transmission to be extracted from the same frequency spectrum occupied by the 60 Hz power frequency, its harmonics, and noise signals that are inherently present in the distribution system.

Inbound data signal transmission is implemented by producing load current pulses $I_t$ in the secondary side of a distribution transformer 303, as shown in FIG. 3. A data 1 bit load current pulse is maintained for the duration of the data bit. These load current pulses combine with the normal substation load current $I_{ss}$, and appear in the distribution system feeder as a total current of Iss+I'. The phase current monitor current transformer 302, located at the substation measures this total load current. This monitoring current transformer 302 provides inbound data current extraction from the distribution system and acts as the inbound data receiver tap-off point. A phase current monitoring current transformer 302 is a normal piece of equipment used in a utility distribution system for monitoring the load current in a distribution feeder circuit. Thus, no modifications are required to the distribution system and no additional equipment or devices need to be installed in the distribution system lines for the substation receiver inbound data recovery.

The total distribution circuit load current $I_{ss}+I_t$, including the inbound data current pulses, is monitored in the phase current monitor current transformer 302 secondary as $(I_{ss}+I)_t/N_{CT}$, where $N_{CT}$ is the turn ratio of the current transformer. This total [load+inbound data current] is connected to a multiple channel current transformer terminator unit 602 in the substation receiver 306. The current transformer terminator unit 602 provides a current to voltage conversion, and supplies the resulting composite voltage waveform to one channel of an analog-to-digital converter 603. The analog-to-digital converter 603 samples the composite waveform, containing the low level inbound data signals, and supplies its digital output to a digital signal processor (DSP) 604. FIG. 3 illustrates this inbound receiver connection for one distribution circuit phase. An actual distribution system will contain multiple feeder circuits, with three phases (A, B, and C phases) each. Thus, a system with 4 feeder circuits, for example, will contain 4×3 or 12 phase current monitoring current transformers 302. Each current transformer provides an inbound data tap to current transformer terminator unit 602 in the substation data receiver 306.

The DSP 604 section of the data receiver 306 continuously receives digitized waveform inputs from each analog-to-digital channel (one for each current monitoring current transformer 302). The DSP 604 operates to extract low level inbound data transmission pulses from the same frequency spectrum occupied by the 60 Hz power frequency, its harmonics, and noise signals that are inherently present in the distribution system. The DSP signal recovery process of the invention is discussed below in connection with the discussion of the Substation Data Receiver.

Those skilled in the art will immediately recognize a number of benefits associated with the invention. First, the invention provides for bi-directional communication. That is, communication can be established from a distribution location (e.g., 304 in FIG. 3) to a substation (e.g., 305 in FIG. 3) and vice versa. Further, the technique of the invention accomplishes inbound and outbound data signal transmission and recovery without physically modifying the existing lines and equipment in the distribution system.

Figure 4:
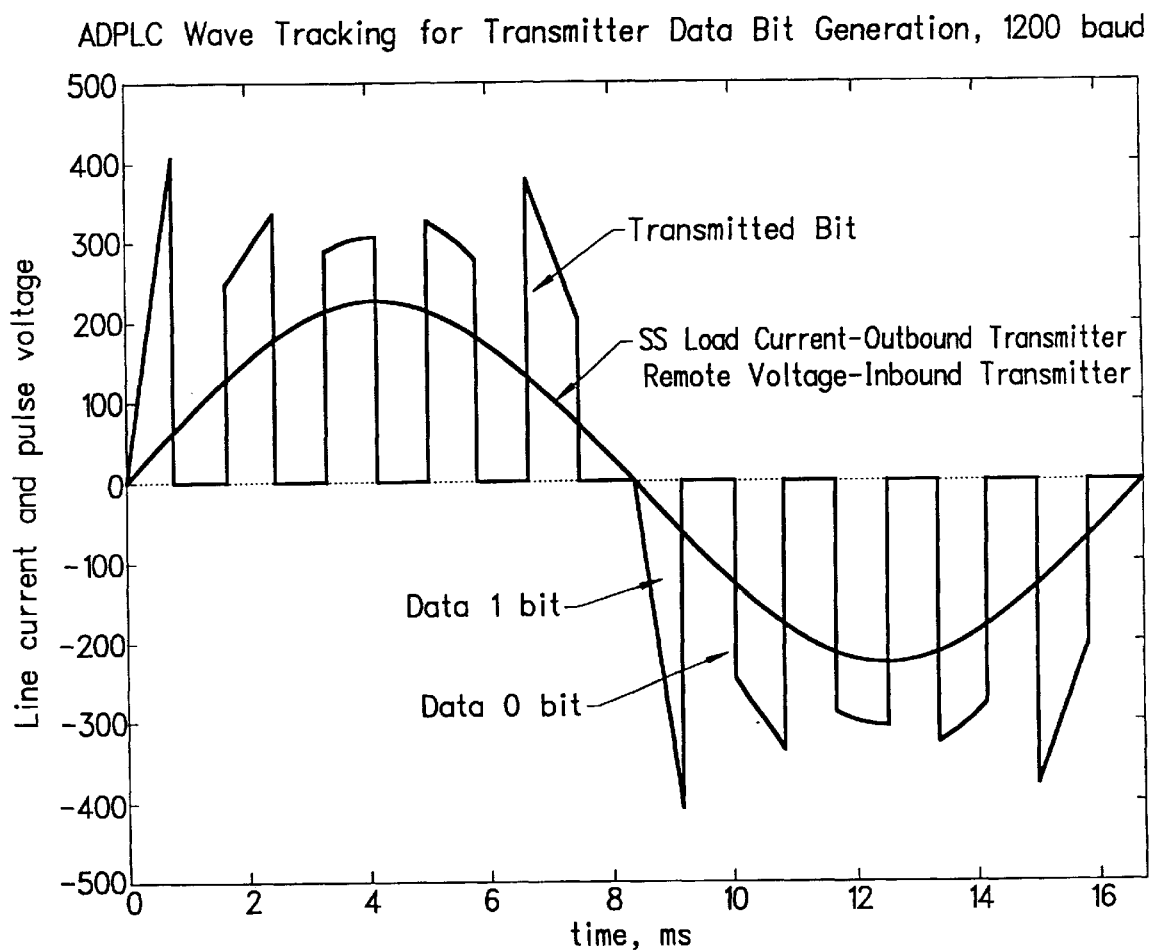
FIG. 4 is an illustration of a digital communication signal in the form of data bit waveforms generated in the secondary side of a signaling current transformer in accordance with an embodiment of the invention.

FIG. 4 is a graphical presentation of a method of wave tracking of a data bit signal for inbound and outbound data transmission. The wave tracking process allows data transmission through nearly the entire portion of each 60 Hz half cycle of the power frequency waveform. This results in the ability to achieve much higher effective data throughput than previously accomplished by other communications systems operating in the electric utility distribution system. Wave tracking divides the 60 Hz voltage waveform into individual data bit time periods beginning at zero crossing. The time duration of each bit period varies with data baud rate. For example, a baud rate of 600 baud divides each 60 Hz cycle into 10 individual time slots of 1.667 ms each. Correspondingly, a baud rate of 1200 baud divides each 60 Hz cycle into 20 individual time slots of 833.3 us each. The diagram of FIG. 4 is shown for a 1200 baud data rate.

A sinusoidal waveform is shown in FIG. 4 for a bit transmission time reference to the 60 Hz power frequency. For outbound data transmission, this sinusoidal waveform represents the substation load phase current waveform, identified as $I_{ss}$ in FIG. 3. For inbound data transmission this sinusoidal waveform represents the distribution phase voltage present at all remote node distribution transformers in the system. A phase locked loop circuit 609 (FIG. 6) provided in the substation transmitter controller circuit and a phase locked loop 2006 (FIG. 20) provided in the remote node transceiver circuit 2000 provide 60 Hz power frequency synchronization and location of the phase voltage zero crossing points for the controller circuitry. Using this 60 Hz waveform synchronization, the outbound and inbound transmitters begin a data message transmission at a 60 Hz zero crossing point, and continue the message transmission throughout each 60 Hz half cycle until the end of the message. As previously described, the substation outbound transmitter produces a voltage pulse, and the remote node inbound transmitter produces a current pulse, only during a data logic 1 bit. No bit transmission occurs for a logic 0 bit.

FIG. 4 shows alternating data 1 and data 0 bits, with bit generation starting at zero crossing and continuing through two 60 Hz half cycles. For best bit detection and recovery in the data receiver, a constant amplitude data bit transmission is desired. The developed wave tracking methodology, including waveform sampling and phase locked synchronization, allows the transmitter controller to determine the actual amplitude of the 60 Hz phase voltage or current waveform at each transmitted bit time slot location. Individual bit time slots are labeled in FIG. 4 as T1 through T20. For each bit transmitted, the controller determines the available 60 Hz waveform voltage (outbound) or current (inbound), and adjusts the transmitter control to produce the desired data bit amplitude. This will be discussed in greater detail in the following sections on the substation and remote node transmitters. As the sinusoidal voltage, or current, waveform amplitude decreases towards zero, maintaining the desired bit amplitude becomes increasingly difficult due to the decreasing waveform amplitude that produces the bit shape. Developed transmitter controller algorithms have maximized the use of the low amplitude portions of the waveform to produce desired data bits. However bit time slots near, or passing through, zero crossing can be unusable, depending on the bit width, due to the lack of voltage or current to produce the data bit. For this reason, certain bits are predefined as "excluded" bits for each data baud rate used, and are ignored by the communications system. This will be discussed in greater detail below.

Figure 5:
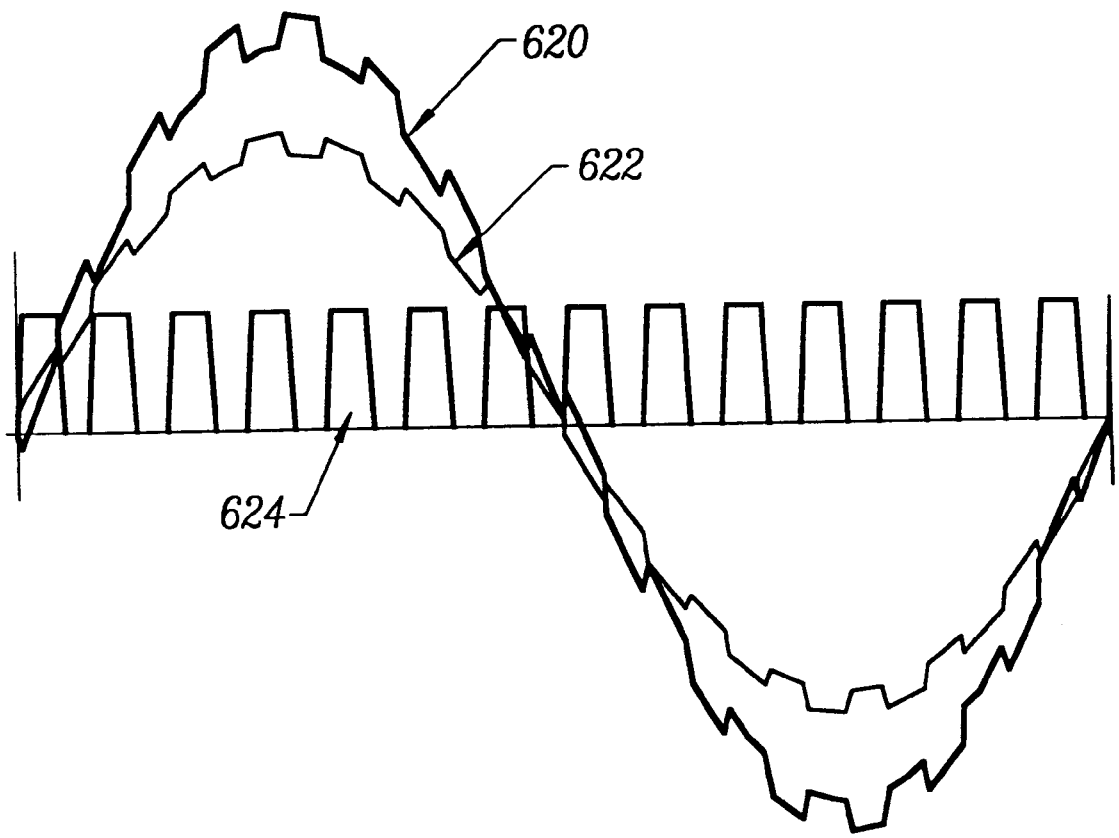
FIG. 5 illustrates a distribution system phase voltage waveform with an amplitude that has been modulated in accordance with an embodiment of the invention.

FIG. 5 illustrates a waveform 620 depicting distribution system voltage perturbations for outbound data transmission, and a waveform 622 for the substation load current perturbations for inbound data transmission. The highest amplitude waveform 620 represents the distribution system voltage (7200 V) waveform, with the voltage reductions during data 1 bit transmission, shown with waveform 624, which is exaggerated for illustration. The second sinusoidal waveform 622 represents the distribution system phase current, with the current amplitude increased (transmitter load current pulses) during data 1 bit transmission. The square wave plot 624 is shown as a reference to indicate the occurrence of data bits in the time sequence.

Figure 6:
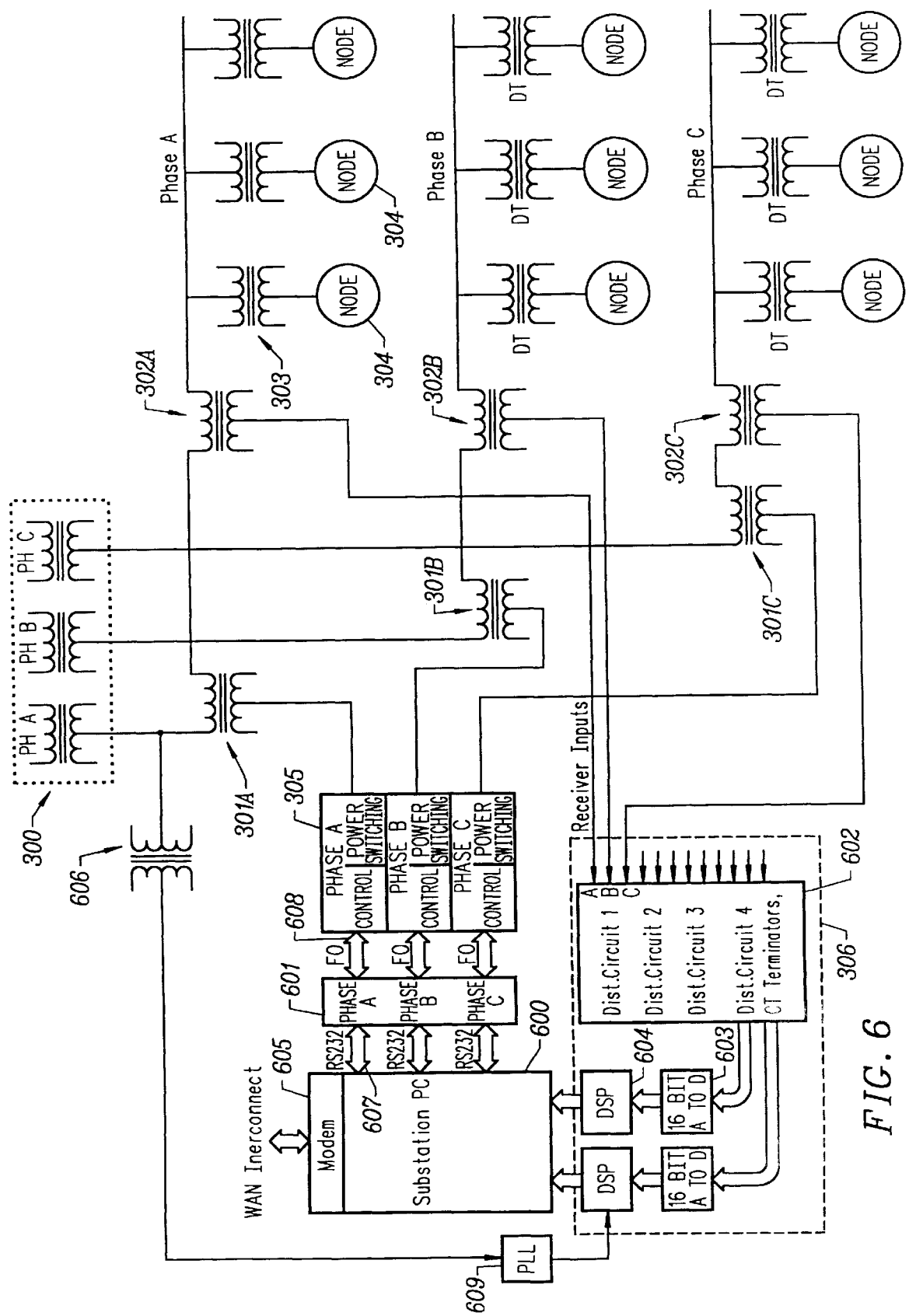
FIG. 6 illustrates substation receiver and transmitter equipment that may be used in accordance with an embodiment of the invention.

FIG. 6 is a block diagram of circuitry of the invention implemented at a distribution location. This diagram indicates the location and physical connection of the various components of the communications system to the three individual distribution phases powered by one substation three phase transformer bank 300 implemented at a distribution substation location. Depending on the substation size and customer base, actual electric utility substations can supply power to the distribution feeders through more than one three-phase transformer. In these cases, the communications system installation shown in FIG. 6 is duplicated for additional substation transformer banks.

FIG. 6 illustrates phase current monitoring current transformers 302A–302C and signaling current transformers 301A–301C. The current monitoring current transformers 302 are connected to distribution transformers 303, which are connected to various power line network nodes 304. Signal launching from the distribution substation location is controlled by a substation personal computer 605, which is connected to fiber optic converters 601. A substation transmitter 305T includes control electronics and power switching devices. Signal reception at the distribution location is controlled by a receiver 306, which preferably includes analog-to-digital converters 603 and digital signal processors 604.

As previously indicated, outbound data transmission is controlled by the substation PC 600. Communications activity can be remotely requested and initiated 10 from a central office through a WAN interconnection provided by a PC modem 605, or through automatic control programming running on the substation PC 600. For data transmission to a particular remote node 304, the PC 600 routes data transmission commands through one of its three RS232 serial communications ports 607, depending on the distribution system phase of the desired remote node 304. These commands are sent through an RS232 to fiber optic converter 601, which connects through a duplex fiber optic cable 608 to the substation transmitter 305T control board. This fiber optic cable 608 provides an electrically isolated interconnection from the substation to the outdoor power transmitter for duplex serial communications between the substation PC 600 and the outdoor power transmitter 305T. Data transmission initiated by the substation PC 600 and routed to the appropriate phase controller in the substation transmitter 305T is implemented by the corresponding power switching unit in the substation transmitter 305T. The power switching unit connects to a signaling current transformer 301 for data signal injection into the selected distribution phase conductor.

Inbound data transmission from a remote node site 304 is produced in response to an outbound query initiated by personal computer 600 for normal status monitoring or meter reading operations, or remote device control functions. One exception to this is a remote node alarm condition, which triggers a spontaneous alarm message transmission from the remote node site. A remote node message transmission originates in any of the three distribution circuit phases, shown in FIG. 6 at a remote node 304 on the secondary side of a distribution transformer 303. Inbound data transmission in any of the three circuit phases within a given distribution feeder circuit is received at the substation by monitoring the current flow through the corresponding phase current monitoring current transformer 302. Current flowing in the secondary side of the phase current monitoring current transformer 302 is connected to one of the inputs of the multiple input current transformer terminator unit 602, part of the substation receiver equipment 306. This current transformer terminator 602 provides the proper resistive termination to convert the current transformer 302 secondary current to a voltage suitable for receiver processing. One analog signal waveform is provided by the current transformer terminator 602 for each inbound receiver channel (one for each current transformer 302). Each of these analog signals is sampled in real time by a 16-bit analog-to-digital (A-to-D) converter 603. Digital outputs from the A-to-D converters are then routed to the digital signal processors (DSP) 604. The DSP processors perform digital signal processing to accomplish data signal extraction from the composite inbound circuit waveforms. Data recovered by this signal processing in the substation receiver 306 is supplied to the central control PC 600 for subsequent system data management and storage.

In sum, as shown in FIGS. 3–6, the outbound data transmitter produces voltage pulses that are applied to the secondary side of a signal injection current transformer 301. These voltage pulses are injected in series with the substation distribution phase voltage, supplied by the substation bank transformer 300. This produces distribution phase voltage perturbations that are detected by remote node transceivers 304.

During idle periods where no data transmission occurs, the secondary of the signal injection current transformer 301 is essentially short circuited (its secondary leads connected together through a very low resistance) by the substation transmitter 305T, causing the current transformer secondary current to flow in a secondary side loop. This idle state is also equivalent to a digital low data bit transmission, where virtually no voltage is developed across current transformer 301. Under this short circuit condition, the current transformer secondary current is a sinusoidal 60 Hz waveform that precisely follows the amplitude and shape of the substation phase load current flowing through the current transformer primary (7200 V) side. During a digital high data bit transmission, specific values of resistance are substituted for the low resistance short circuit by the substation transmitter 305T. Since the signal injection transformer is a current transformer, the current flowing in the signaling current transformer 301 secondary tends to remain essentially constant (following the primary side current flow) even with varying secondary side load conditions. For this reason, the current transformer secondary side current flow retains its amplitude and shape during the transmitter resistance insertion condition, since the inserted resistance does not alter the current flow. This also produces the requirement that the secondary side current must always be terminated into either a short circuit or a resistance value that will maintain the developed voltage within safe operating limits.

A voltage is developed across the inserted resistance in the transmitter 305T equal to I×R (where I is the secondary loop current and R is the inserted resistance) and thus across the secondary side terminals of the signal injection current transformer 301. Developed wave tracking methods discussed above (60 Hz synchronization, bit interval allocation, waveform amplitude tracking) are employed to produce data bits throughout each half cycle of the phase voltage waveform. By monitoring the time varying phase current waveform in the current transformer secondary, and through the transmitter circuitry 305T, a resistance value is calculated to produce a desired signaling voltage amplitude V1. This resistance is connected into the current transformer secondary current loop by the power electronics (power switching circuits) in the transmitter 305T. Since the current waveform varies sinusoidally with time, a new and specific resistance value is calculated and inserted at specific time intervals during each data 1 time period to maintain desired data bit amplitude throughout each half cycle. This is illustrated in FIG. 4.

Figure 7:
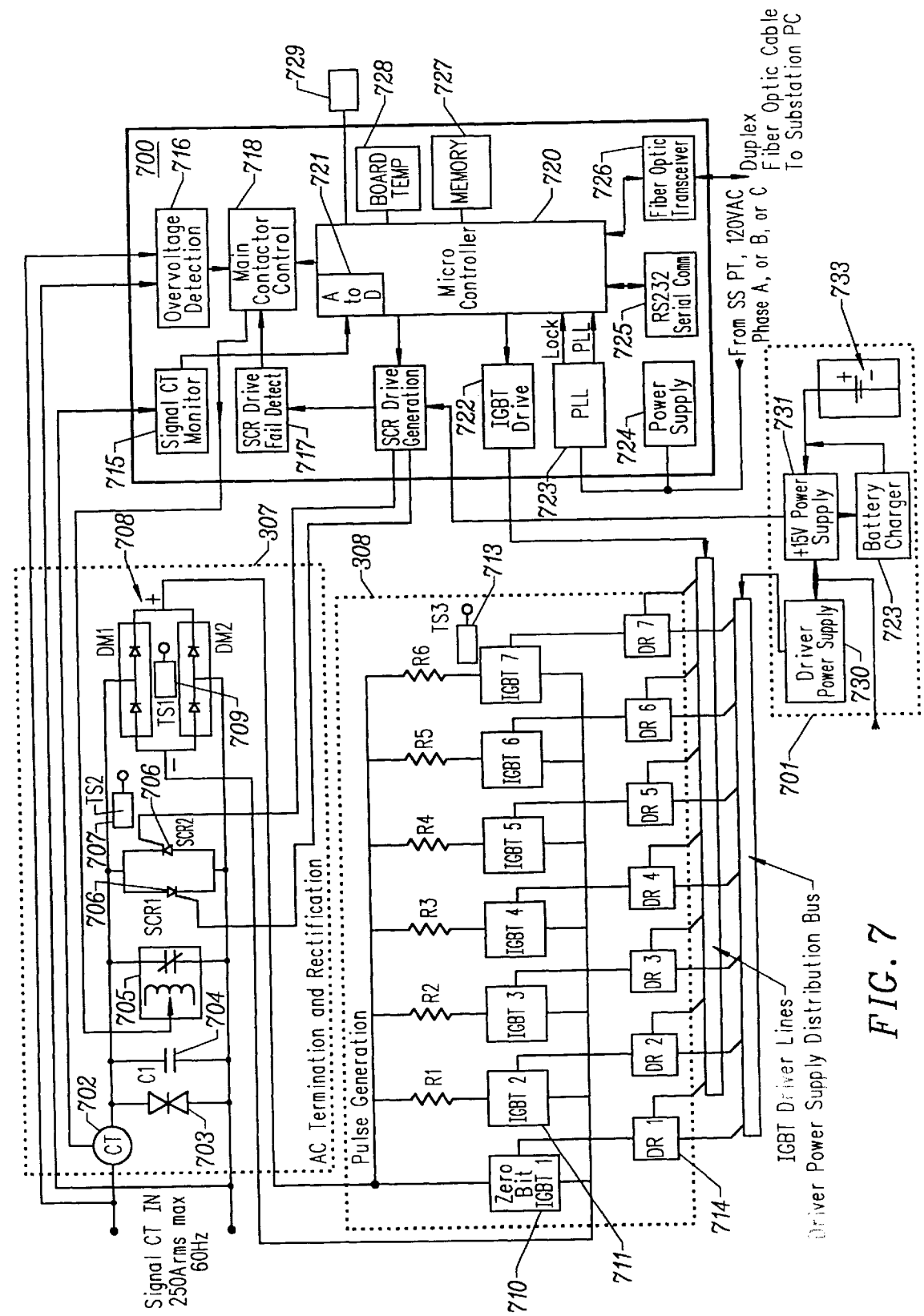
FIG. 7 is a block diagram of a substation transmitter formed in accordance with an embodiment of the invention.

FIG. 7 is a block diagram of a signal launching circuit of the invention. In particular, the figure illustrates a substation transmitter, which implements a power switching process to produce distribution system phase voltage perturbations during data transmission. Items shown in FIG. 7 represent the components required for data transmission on one of three phases of the distribution system voltage. These components are duplicated for the other two phases of data transmission. All three sets of components are housed inside the three-phase transmitter unit, which is discussed in connection with FIG. 8.

In FIG. 7 the signal injection current transformer 301 is connected to the substation transmitter input terminals of the AC Termination and Rectification section 307. Signal injection current transformer 301 current flows through the phase current monitoring current transformer 702 for current waveform sampling by the transmitter controller A-to-D converter 721. Current then flows through one of several circuit ranches depending on the transmitter operating state. For example, the current may flow through the main contactor 704 when the transmitter is in a disabled or idle state for several minutes or more. This large, high current, normally closed contactor provides signal injection current transformer 301 termination when no transmission is desired.

Current may also flow through SCR1 and SCR2 706 when the transmitter is active, but temporarily idle between message transmissions. These high current, solid state SCR devices can switch on rapidly between message periods, providing the required termination of the current transformer 301 current flow. Since an SCR is a monopolar device (allowing current flow in only one direction) two SCR devices are used in an anti-parallel configuration to allow current conduction in each half cycle of the 60 Hz current waveform.

Current may also flow through the bridge rectifier block 708 and into the Transmission Pulse Generation 308 section during digital high data bit transmission. The bridge rectifier block 708 includes dual diode high current, high voltage modules DM1 and DM2. These diodes implement a full wave rectifier to the 60 Hz current waveform, allowing the monopolar IGBT devices to be utilized in each half cycle of the 60 Hz AC waveform, and thus permitting data bit generation throughout the entire non-zero amplitude region of the 60 Hz cycle. The pulse generation 308 section is comprised of high current, high voltage solid state insulated gate bipolar transistor (IGBT) switches IGBT1–IGBT7, and power resistors R1–R6. During transmission of a digital low data bit the zero bit IGBT1 is turned on, shunting the current flow through the low resistance IGBT and preventing a data bit voltage from being generated. During transmission of a digital high data bit, one or more of the branch resistor IGBTS (IGBT2–IGBT 7 in FIG. 7) are turned on for the duration of the digital high data bit. This branch resistor configuration forms a high power D-to-A (digital-to-analog) converter, with resistors R1–R6 arranged in a binary resistance value progression (R2=2×R1, R3=2×R2, etc.). For any given bit position within the 60 Hz current waveform, the controller 700 measures the current amplitude through the signal CT monitor 715 and A-to-D converter 721. It then calculates the correct resistance value to be inserted in the transmitter current loop to produce the desired data bit voltage amplitude. The controller 700 then turns on the specific IGBT devices (IGBT2–IGBT7), through IGBT drive outputs 722 and IGBT drivers (DR2–DR7), to parallel the correct resistors R2–R6 to produce a net resistance value that is the closest to the calculated value. This process is repeated at multiple incremental time intervals within each data bit interval to re-compute the required resistance value and maintain a near constant bit amplitude for the duration of the bit interval. When the digital high data bit time duration has elapsed, the process is repeated for the next data bit, turning on the zero bit IGBT2 for a digital low data bit, or a combination of branch resistor IGBTS (IGBT2–IGBT7) for a digital high data bit. When the message transmission is completed, the anti-parallel SCRs 706 devices are turned on, to terminate the current transformer current flow until the start of the next transmitted message, if the transmitter is to remain active. If the transmitter will be inactive for several minutes or more, the main contactor 705 is closed until the next message session.

As described above, the resistance values of the individual branch resistors R1–R6 in FIG. 7, are selected as a binary value progression from R1 through R6. R2 is twice the value of R1, R3 is twice the value of R2, and so forth through R6. This results in a high power 6 bit digital to analog converter, with 64 different possible resistance values produced by turning on the appropriate combination of IGBT devices. Since the desired signaling voltage V1 is equal to the signal injection current transformer 301 secondary current $I_{sec}$ multiplied by the transmitter inserted resistance R, a range of required transmitter resistance values is determined from a range of actual substation load current variations (producing $I_{sec}$ from $I_{ss}$), from the lightest to heaviest expected substation load conditions. The actual individual branch resistance values are chosen to provide the required range of different resistance values, produced by paralleling the resistance branches. The invention has been implemented with branch resistor values and power semiconductor devices that can operate with a substation load current $I_{ss}$ ranging from approximately 100 Arms to 1500 Arms. This design produces a signaling CT 301 secondary side signaling voltage, V1, up to 500 V peak, and V2 across the primary of up to 83 Vpeak (FIG. 3).

FIG. 7 illustrates a substation transmitter controller board 700, which provides all required data bit generation, synchronization, wave tracking, and status monitoring functions. As described above, the line current monitor CT 702 provides a current signal to the signal CT monitor section 715, which outputs a voltage waveform proportional to the signaling CT 301 current waveform. The 10 bit A-to-D converter 721 samples this waveform, contained in the micro-controller IC 720 for current waveform monitoring and wave tracking. A pair of conductors is connected from the transmitter input terminals to the over-voltage detection circuit 716. This circuit monitors the voltage amplitude developed by the data transmitter, and implements transmitter shut down in the event that the transmitter signal voltage exceeds preset limits. An output from the over-voltage detector 716 is connected to the main contactor control circuit 718, which provides energizing and de-energizing switching to the main contactor 705. An SCR drive generation circuit 719 produces the required drive signals to the SCR devices 706 to assure proper turn on of these devices over the expected operating temperature range. An SCR drive fail circuit 717 monitors the output from the SCR drive circuit 719, and produces a shut down signal to the main contactor control circuit 718 in the event of failure or improper operation of the SCR drive signals.

The IGBT drive interface circuit 722 provides IGBT drive signals from the micro-controller 720 to the IGBT drivers 714. The IGBT drivers 714 provide optically isolated drive signals to the IGBT devices 710 and 711. A phase locked loop PLL circuit 723 provides a signal to the micro-controller 720 that is phased locked to the substation voltage phase PT 606. This PLL signal enables the required synchronization and wave tracking process for data bit generation to be implemented in the controller 720.

Serial communications from the transmitter controller board 700 to the substation master control PC 600 is provided through a fiber optic transceiver 726. A fiber optic cable 608 is connected from the transceiver 726, from each transmitter controller board 700, to the RS232 to fiber optic converters 601 at the substation PC 600 location. A local RS232 serial port 725 is also provided on the controller board 700 for direct connection of an external PC for board testing.

Preferably, various transmitter operating temperatures are monitored by the micro-controller 720. For example, bridge diode temperature may be measured via temperature sensor 709 (TS1), SCR temperature may be measured via temperature sensor 707 (TS2), IGBT temperature may be measured via temperature sensor 713 (TS3), controller board temperature via temperature sensor 728, and tank oil temperature via temperature probe 729. Over-temperature limits are predetermined for each sensor, and the transmitter operation is shut down by the micro-controller 720 if any of these operating limits are exceeded.

Memory 727 provides micro-controller memory for program, data, and nonvolatile parameter storage. A controller power supply 724 provides operating DC voltages to the various circuitry on the controller board 700. A separate power supply and battery charging section 701 provides a +15 VDC power supply 731 voltage to the SCR driver 719. A backup battery 733 preferably provides power to the SCR driver 719 during momentary 120 VAC power outages to prevent drive power interruption to the SCR's 706 that provide termination to the signal injection CT 301. A backup battery charger circuit 732 may be used to maintain a charge to the backup battery 733 during normal operation.

Figure 8:
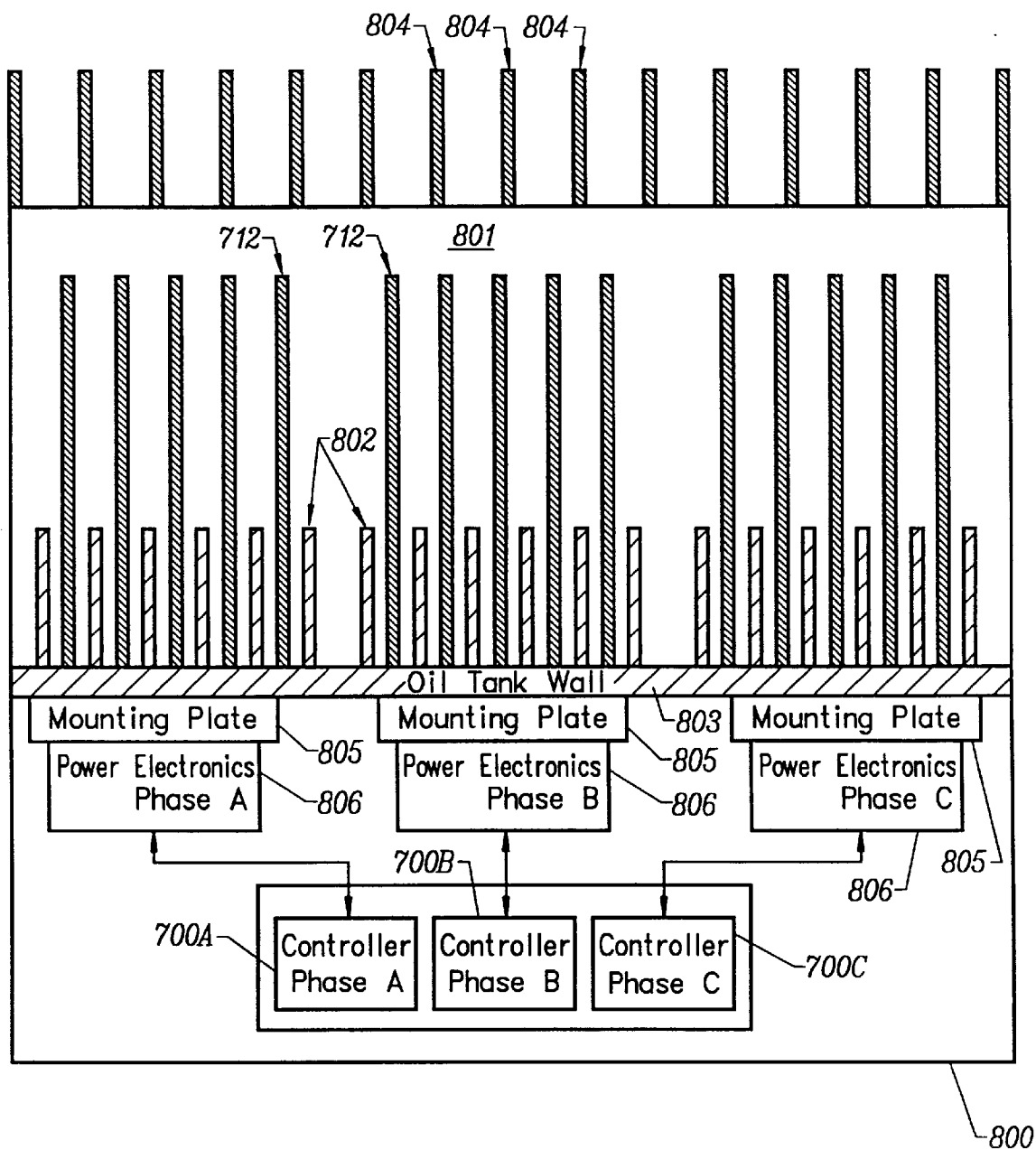
FIG. 8 illustrates a housing for a substation transmitter of the invention.

FIG. 8 is a block diagram drawing of a three-phase substation transmitter unit enclosure 800 that may be used in accordance with the invention. The transmitter unit is constructed in a tank enclosure typically used for a three-phase oil cooled transformer. A section is provided in the enclosure for the power electronics 806 and controller section 700, shown in FIG. 7. An oil reservoir 801 is provided adjacent to this electronics section, for oil convection cooling of the power resistors 712. The power resistors 712 are mounted into the oil tank wall 803 and are inserted into the oil reservoir 801. Heat dissipated in these power resistors 712, produced during data transmission, produces natural convection flow in the oil. When heated, the oil circulates out through heat dissipation fins 804 that are incorporated into the oil tank design and back to the power resistor oil reservoir 801. The power branch resistors 712 are designed as oil immersion resistor elements with individual average wattage ratings from several hundred watts to 3 kW, depending on the individual resistor value. Power electronics devices in power sections 806 are mounted to aluminum plates 805, that provide heat absorption, heat spreading over the plate area, and conduction into the oil tank wall 803. Heat generated in the power devices during data transmission is conducted through the mounting plates 805, through the tank wall 803, and is dissipated into the oil by heat sink fins 802, which are welded onto the oil tank reservoir wall 803. These fins 802 provide the necessary surface area for sufficient heat conduction from the power semiconductors to the oil for dissipation to the external environment.

Now that the housing and electronics associated with the invention have been disclosed, attention turns to details associated with various data formats utilized in accordance with the invention. Several physical layer processes are implemented by the substation system control personal computer prior to the transmission of an outbound message by the substation transmitter. These message preparation procedures are considered physical layer processes because they are applied at the data bit level. The purpose of these processes is to assemble a full outbound message frame, specifically arranged to be recognizable by the remote node transceivers as a valid outbound message. Following the construction of a message frame, four data bit encoding processes are implemented, which physically rearrange certain portions of the message bits. These encoding processes are applied for the purpose of error detection and correction, maximizing the message immunity to distribution system burst noise, and bit manipulation unique to the invention.

Figure 9:
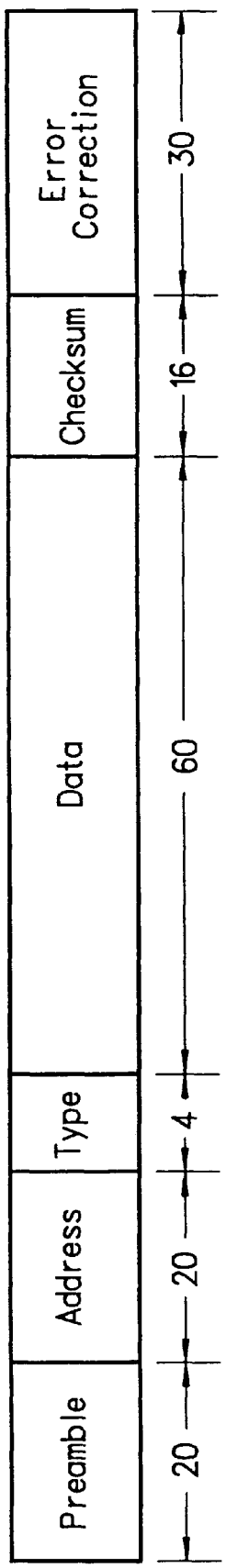
FIG. 9 illustrates an outbound message frame that may be used in accordance with an embodiment of the invention.

FIG. 9 illustrates the construction of a typical outbound and inbound message frame. While the exact length of the message frame can vary with baud rate and communication conditions, the message frame shown in FIG. 9 is typical. The outbound message frame is divided into separate sections called fields. The first field is the message preamble field, made up of 8–30 data bits depending on the baud rate. The specific bit content of the preamble is predefined, fixed, and known to the remote node data receiver. This message preamble identifies a valid message to the data receiver.

Following the preamble field is an address field. The 20 bit address field provides the unique address of the individual remote node transceiver being polled. A 20 bit field allows $2^{20}$ or 1,048,576 different remote node transceivers to be addressed.

A type field may also be used. This 4 bit field identifies the type of message that is being transmitted. Examples of message types include: system testing message, link control (baud rate, error control, etc.) message, HDLC message field for routing to other devices such as electric, water, and gas meters, remote node units synchronization message, alarm query message, multiple transceiver broadcast message, and the like.

A data field is also included. This variable length field contains the actual data being transmitted to the remote node receiver. To maintain compatibility with HDLC protocol, the message frame structure provides for the incorporation of an HDLC compatible field in the data field of FIG. 9.

HDLC is a bit-oriented synchronous protocol developed by the International Standardization Organization [ISO-4335]. HDLC was designed to operate over a single physical circuit between two systems. The three types of stations defined by HDLC are the primary, secondary and combined. The primary station has the responsibility of controlling the operation of the link by issuing commands called requests to the secondary stations. The secondary station operates entirely under the direction of the primary station, and issues responses to the commands. A combined station issues both commands and responses. The system of the invention uses the substation as the primary station and the remote node devices as combined stations. The remote nodes function principally as secondary stations except for the transmission of alarms. Under alarm conditions, the secondary stations (remote nodes) independently initiate communication to the primary station (substation).

Figure 10:
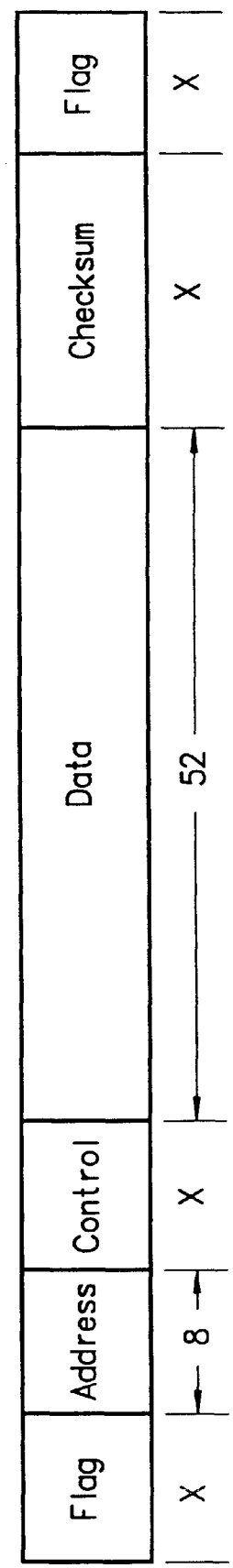
FIG. 10 illustrates a basic frame structure that may be used in accordance with an embodiment of the invention.

The operation of HDLC consists of the exchange of message frames between stations. In the case of an HDLC message type, an HDLC compatible frame, shown in FIG. 10, is embedded into, and takes the place of, the data field shown in FIG. 9. The basic frame structure of an HDLC frame is made up of 6 fields as shown in FIG. 10.

The HDLC frame includes a flag field. The flag field is a unique sequence of 8-bits that delimits the start and end of an HDLC frame. An address field is also provided. Each secondary station located at a remote node transceiver site is identified by an address. The desired message destination can be any of several devices, including an electric gas or water meter for automatic meter reading, or a distribution system device, such as a recloser, switch, etc. for status monitoring and control. This address field identifies the particular device at the remote node site for communications. In the case of a transceiver installed into an electric meter, the address field in the message frame identifies the transceiver unit, and the address field imbedded in the HDLC frame identifies the electric meter. In the exemplary system of FIG. 10, the HDLC address frame contains 8 bits, allowing $2^8$ or 256 different remote devices to be addressed.

FIG. 10 also illustrates a control field that may be a subset of the frame shown in FIG. 9. The control field may be implemented in any number of ways. However, by way of example, the control field is a sequence of 8 bits used to identify the type of data contained in the frame. Since a data type field exists in the frame structure of FIG. 9, this field is not required and is not transmitted. The data field in an HDLC frame structure is variable in length. For illustration, FIG. 10 illustrates a field length of 52 bits. A frame check sequence field may also be used. The frame check sequence contains a bit sequence that provides for the detection of transmission data by the receiving station. Since a checksum field exists in the frame structure of FIG. 9, this field is not required and is not transmitted.

For the system data transmission of an embodiment of the invention, the flag, control, and frame check sequence fields are redundant, since the HDLC frame is imbedded into the data field, and do not need to be transmitted. A full HDLC compatible message frame can be reconstructed in the data receiver by adding the omitted fields to the message. In the example of FIGS. 9 and 10, the HDLC message frame reduces to 8 address bits, and 52 data bits. For an HDLC message type, these 60 bits comprise the data field in the message frame of FIG. 9.

A checksum field may also be utilized. These 16 bits are included for the purpose of error detection. A checksum is a number computed from the content of the Address, Type, and Data fields. In the data receiver, a corresponding checksum is computed from the recovered bits in the Address, Type, and Data fields, following error correction, and is compared to the original checksum. If the two checksums match, the recovered data is considered valid. If they do not match, the recovered data is considered invalid and the received message is assumed to be in error.

An error correction field may also be used. These 30 bits are included for the purpose of implementing error correction in the data receiver. Error correction encoding is applied, prior to message transmission, to the Address, Type, Data, and Checksum fields. In the example of FIG. 9, these fields contain 100 data bits. One possible method of applying error correction encoding divides these 100 bits into 10 blocks of 10 bits each. The error correction encoding converts these 10 bits into 13 other bits, in such a way as to allow up to 2 of the original 10 bits of data in each block to be corrected in the error correction decoding process in the data receiver. The error correction encoding process converts the original 100 bits into 130 transmitted bits, including the 30 error correction bits.

The data bit checksum and error correction encoding described above is not applied to the message preamble. The message preamble is transmitted in its original form.

Following the construction of an outbound message frame in accordance with the foregoing scheme, two distinct bit conversion processes are applied to all message fields, except the message preamble field, prior to message transmission. The message preamble is transmitted in its original form, which is constructed to include the bit conversion processes. These inventive conversion processes are described.

One conversion process is termed a bit combination and exclusion process. Bit time slots near, or passing through, zero crossing will produce bits with much lower amplitudes, due to the lack of voltage or current to produce the data bit. Attempts to recover data bits strictly as they are transmitted in these near zero crossing regions would produce frequent bit errors. For this reason, one of two possible techniques, unique to the invention, is used to lower the overall message bit error rate by uniquely accounting for data bits transmitted in these bit positions. These two techniques are called Bit Combination, and Bit Exclusion, and are discussed below in connection with the remote node transceiver and pulse width modulation control.

Another conversion process is termed current transformer anti-saturation, which is only applicable for outbound data transmission. The signal injection CT 301, like any other magnetic core transformer, can become saturated if a voltage is applied across its primary or secondary windings, in one polarity (or direction), for more than a certain amount of time. In normal 60 Hz operation, the magnetization built up in the transformer core during one half cycle is automatically removed by the magnetization created in the opposite polarity, during the next half cycle. This is assured since the waveform of each half cycle is essentially the same as the waveform of the next half cycle, producing no net DC bias on the transformer. However, outbound bit transmission in the system of the invention is implemented by producing monopolar pulse voltages across the signal CT 301 secondary windings. There is no inherent guarantee that the data bit content contained in positive half cycles will offset the data bit content in the negative half cycles during a particular message transmission. Thus, a net positive or negative magnetization could be produced and remain in the signaling CT 301 magnetic core, eventually preventing data transmission. Each data 1 bit voltage transmitted for an amount of time equal to the data bit width produces a given volt-second product over the data bit time slot. A maximum total volt-second product exists for any particular magnetic core transformer, above which the core will saturate. The anti-saturation process converts the desired message content that could produce unequal magnetization in each half cycle into a bit stream that attempts to balance the net magnetization in the signal CT 301 core. These two message bit conversion processes are performed prior to the transfer of the final message frame to the substation transmitter controller 700.

Outbound data transmission protocol will be discussed below in connection with the system communication protocol section. This system protocol includes remote node transceiver query, inbound and outbound communication management, and remote node alarm handling.

Figure 11:
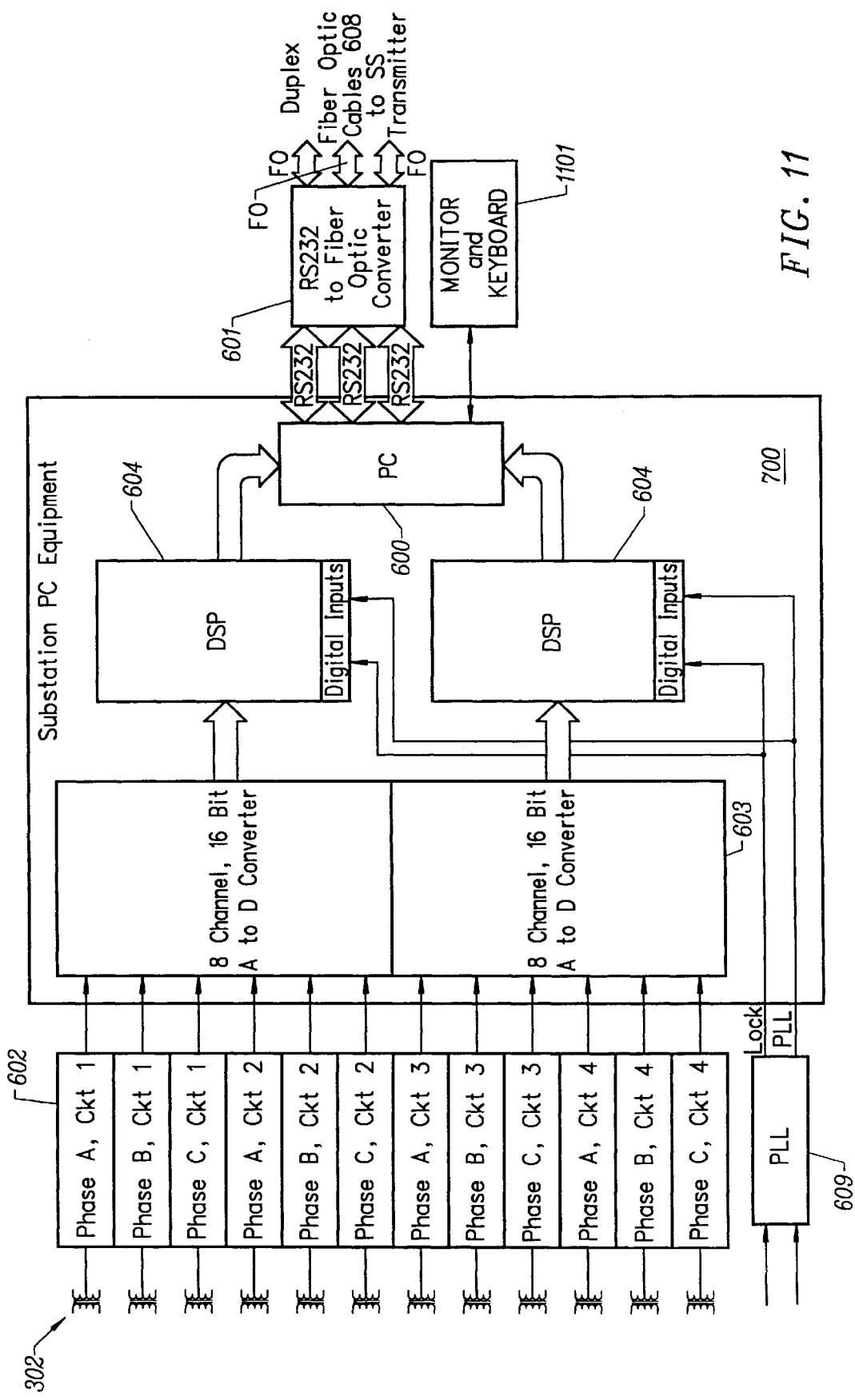
FIG. 11 is a block diagram of a substation receiver system in accordance than embodiment of the invention.

FIG. 11 is a block diagram of the substation data receiver system. As described above, the total distribution phase load current, including the generated data current pulses, is monitored by the phase current monitoring CT 302. One of these CTs is normally provided in the distribution system at the substation for the phase A, B, and C conductors in each feeder circuit. FIG. 11 shows twelve phase current monitoring CTs 302, representing four circuits of three phases each. The secondary of each monitoring CT 302 is connected to the CT terminator unit 602. Each CT terminator 602 input represents a data receiver input channel, and a separate and identical CT terminator circuit is provided for each receiver input channel. The terminator circuit 602 includes an input current transformer providing ground circuit isolation between the phase current monitoring CT 302 and the receiver equipment. An input CT termination resistor provides current to voltage conversion and voltage scaling for the monitored current waveform. The CT terminator 602 also includes a lowpass filter to remove any high frequency noise above the frequency band of the data transmission. The CT terminator 602 preferably includes transient voltage clipping to protect the A-to-D converter inputs.

Outputs from the CT terminators 602 are connected to the substation receiver PC equipment 700 and into the multiple input A-to-D converters 603, located on the A/D-DSP circuit cards plugged into PCI bus slots in the substation PC 600. Each A-to-D input provides a separate A-to-D converter, anti-aliasing filter, and software programmable gain. Since the substation phase load current varies significantly (as much as 6× or more) from month to month, the amplitude of the monitored current waveform, and thus the input to the A-to-D converters, varies accordingly in amplitude. The peak to peak amplitude of the AC waveform applied to the A-to-D inputs must be maintained within the A-to-D operating range to avoid waveform clipping, and thus data loss. In addition, it is desirable to maximize the amplitude to maximize the dynamic range of the A-to-D conversion. This level control is accomplished under PC software control by monitoring the sampled waveform amplitude, and adjusting the programmable gain stages preceding A-to-D converter 603. In this manner, the waveform applied to the A-to-D converter for sampling is maintained within a small range of amplitude variations. The A-to-D converters 603 sample the incoming waveform, representing the substation phase load current, and pass the digitized results to the DSPs 604. The signal processing techniques and processes performed by the DSPs are discussed below.

FIG. 11 illustrates a phase locked loop (PLL) circuit 609, which provides an output signal that is phase locked to the substation voltage phase A. This phase locked signal provides 60 Hz power frequency synchronization and location of the phase voltage zero crossing points for the DSP 604. Since each inbound data message is synchronized to and begins at a zero crossing point, the DSP receiver utilizes this 60 Hz waveform synchronization to conduct a continuous search for a valid data message synchronized to the 60 Hz zero crossing points.

Three RS232 serial ports and RS232 to fiber optic converters 601 are provided for communication with each of the three substation transmitter controller boards 700. Duplex fiber optic cables 608 connect the RS232 to fiber optic converters 601 to the substation transmitter controller boards 700 located in the outdoor substation transmitter 305T. A VGA monitor and keyboard 1101 is provided for the substation PC 600 for local operator interfacing and system testing.

Attention now turns to digital signal processing and data recovery performed in accordance with the invention. In FIG. 11 outputs from the individual CT terminators 602 are shown connected to the multiple A-to-D 603 inputs. The A-to-D converters 603 sample the voltage waveforms, representing the substation phase load currents, and pass the digitized results to the DSP 604. Each separate A-to-D channel output is sampled at a rate of 12,600 samples per second. This sampling rate is a multiple of the 60 Hz line frequency, and its $3^{rd}$, $5^{th}$, and $7^{th}$, harmonics, computed as 60 Hz×3×5×7×2=12,600. This provides an integer number of A-to-D samples for each period of these individual frequency components required for highly effective filtering of the 60 Hz fundamental frequency and individual harmonic components in the DSP signal processing.

Figure 12:
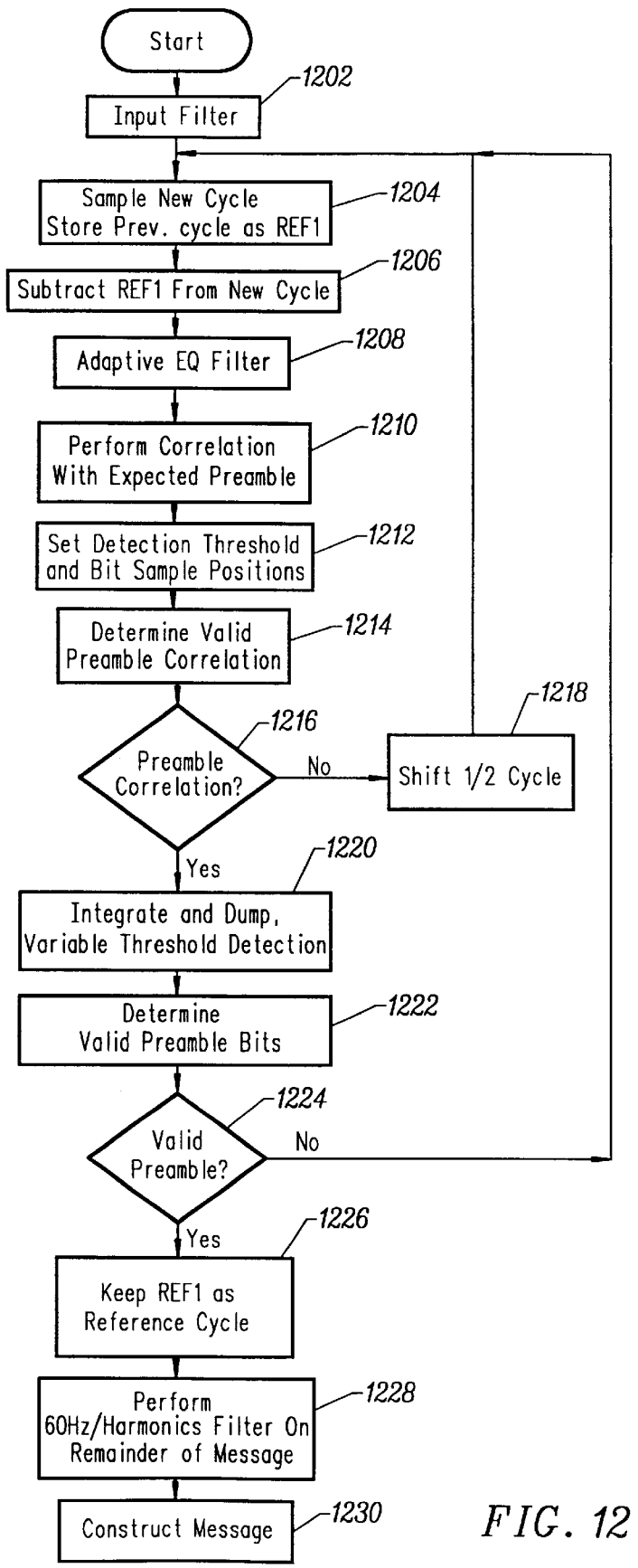
FIG. 12 illustrates filtering steps performed by a receiver constructed in accordance with an embodiment of the invention.

FIG. 12 is a flow chart of the sample-and-subtract filter routine implemented in the digital receiver. This highly effective filter implementation is necessary to remove the 60 Hz power frequency and its harmonic frequencies from the composite waveform containing the inbound data transmission.

The composite input waveform is initially filtered (step 1202). Preferably, a low pass and band shaping filter is used to remove undesirable high frequency and noise components. The digital filter process samples a new cycle of the 60 Hz waveform using current transformer 302 and stores the previous cycle (step 1204). It is assumed that this reference cycle does not contain inbound message data. The stored REF 1 signal is then subtracted from the new cycle (step 1206). The resultant value is then processed with the adaptive equalizer filter (step 1208). As discussed below, the adaptive equalizer filter function is an estimate of the inverse of the inbound current transfer function of the distribution system.

A correlation on the message cycle is then performed using the expected preamble (step 1210). Using the results of the correlation, fine adjustment bit sampling, and bit detection threshold are set (step 1212). A preamble correlation is then determined (step 1214). If a preamble correlation does not exist (step 1216—no), then the cycle is shifted one half. In other words, if no preamble is detected, the DSP 404 shifts over one half cycle, erasing the first half of REF 1 from memory, and uses the first cycle remaining in memory as the new reference cycle. Steps 1204–1214 are repeated, examining only one new cycle until a valid preamble correlation exists (step 1216—yes). When a preamble correlation exists, the preamble is integrated and dumped to measure the detected bit energy (step 1220). Variable threshold detection is then applied to determine whether the sampled bit is a digital high or a digital low (step 1222). If valid preamble bits do not exist, control returns to step 1204, otherwise REF 1 and REF 2 cycles are kept as the reference cycles, and the sample-and-subtract filter process is performed for the remainder of the message. The remainder of the message is filtered for 60 Hz harmonics (step 1228) and then the message is recovered (step 1230). Message recovery procedures are physical layer bit manipulation processes, implemented in the data receiver to remove, or reverse, the effects of the corresponding processes performed for message transmission. A description of these procedures was provided above in connection with the substation transmitter, physical layer message bit conversion. The recovery process performs the reverse of the previously described current transformer anti-saturation, bit combination or exclusion, error correction, and checksum processes.

After a message is reconstructed as described above, the message type field is checked by the substation PC 600 (or DSP 604 for an outbound message) to determine the required message routing or action requested by the message transmission. Messages types are discussed above in the discussion on Physical Layer Message Frame Configuration.

The ISRF procedure, step 1208, of the flow chart routine of FIG. 12, applies the inverse of the distribution system frequency response shown in FIG. 1. The objective of the ISRF filter process, performed in the receiver DSP, is to cancel the effects of data pulse propagation through the distribution system. This process thus attempts to restore the transmitted data pulse shape back to its originally transmitted form. Without this procedure, the received data pulse would be badly distorted, causing inter-symbol interference (one pulse interfering with an adjacent pulse). Since this ISRF process is implemented in the data receiver as a DSP routine, it can be adaptive, modifying its filter function as required to track short term or long term changes in the frequency response characteristics of the distribution system.

Attention now turns to the processing performed at a remote node transceiver. In particular, attention turns to pulse width modulation (PWM) data transmission technique performed in accordance with the invention.

Transmission of inbound data bits is accomplished by generating current pulses $I_t$ in the secondary side of the distribution transformer 303, by the remote node transmitter 304, FIG. 3. Current pulses $I_t$ are detected in the secondary side of the phase current monitoring current transformer 302 by the substation receiver 306. As discussed above, FIG. 4 illustrates nearly constant amplitude inbound data current pulses, time synchronized to the 60 Hz sinusoidal current waveform through the process of wave tracking. Inbound data current pulses are produced in the remote node transmitter using techniques of the invention. These techniques combine the wave tracking synchronization process with special pulse shaping methods to produce the desired data bit current pulses, while minimizing the rate of change of current flow in the distribution transformer secondary. While inbound data current pulses could be produced by simply switching a load resistance across the 240 V secondary of the distribution transformer 303 for the desired time duration, the abrupt turn-on and turn-off of current flow would produce high values of di/dt, or rate of change of current. This high di/dt change would produce a high level of voltage change in the secondary of the distribution transformer, which is equal to the leakage inductance of the distribution transformer, multiplied by the di/dt current change. This results in the well known statement of voltage across an inductor with respect to current change, or V=L× di/dt, where L is the leakage inductance of the distribution transformer 303. In order to limit these voltage transients produced in the distribution transformer leakage inductance, the rate of change of current must be controlled. For this reason, the remote node transmitter produces shaped data bit current pulses using a pulse width modulated (PWM) control technique. Using this technique, current pulses are produced that have a controlled rise and fall time, and thus a limited di/dt current change. These shaped current pulses, with limited di/dt, minimize the voltage dips and peaks, and therefore interference to distribution transformer loads, produced in the secondary side of the distribution transformer 303 during data bit transmission.

Figure 13:
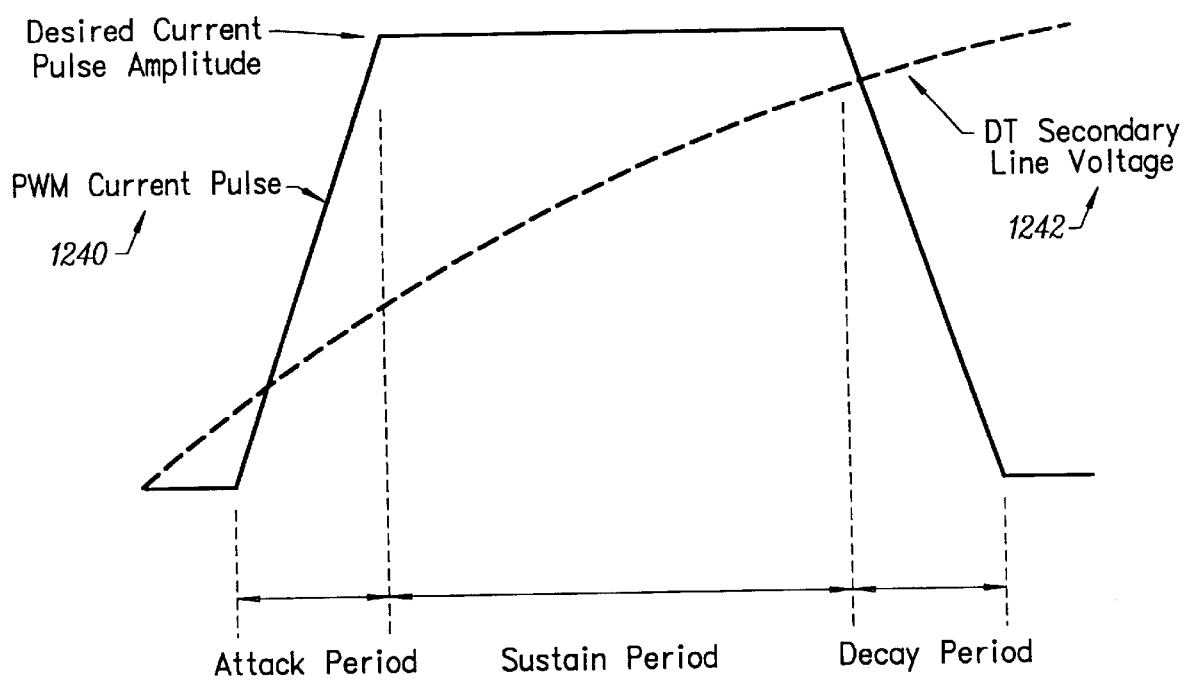
FIG. 13 illustrates pulse width modulation current pulse control periods utilized in accordance with an embodiment of the invention.
Figure 20:
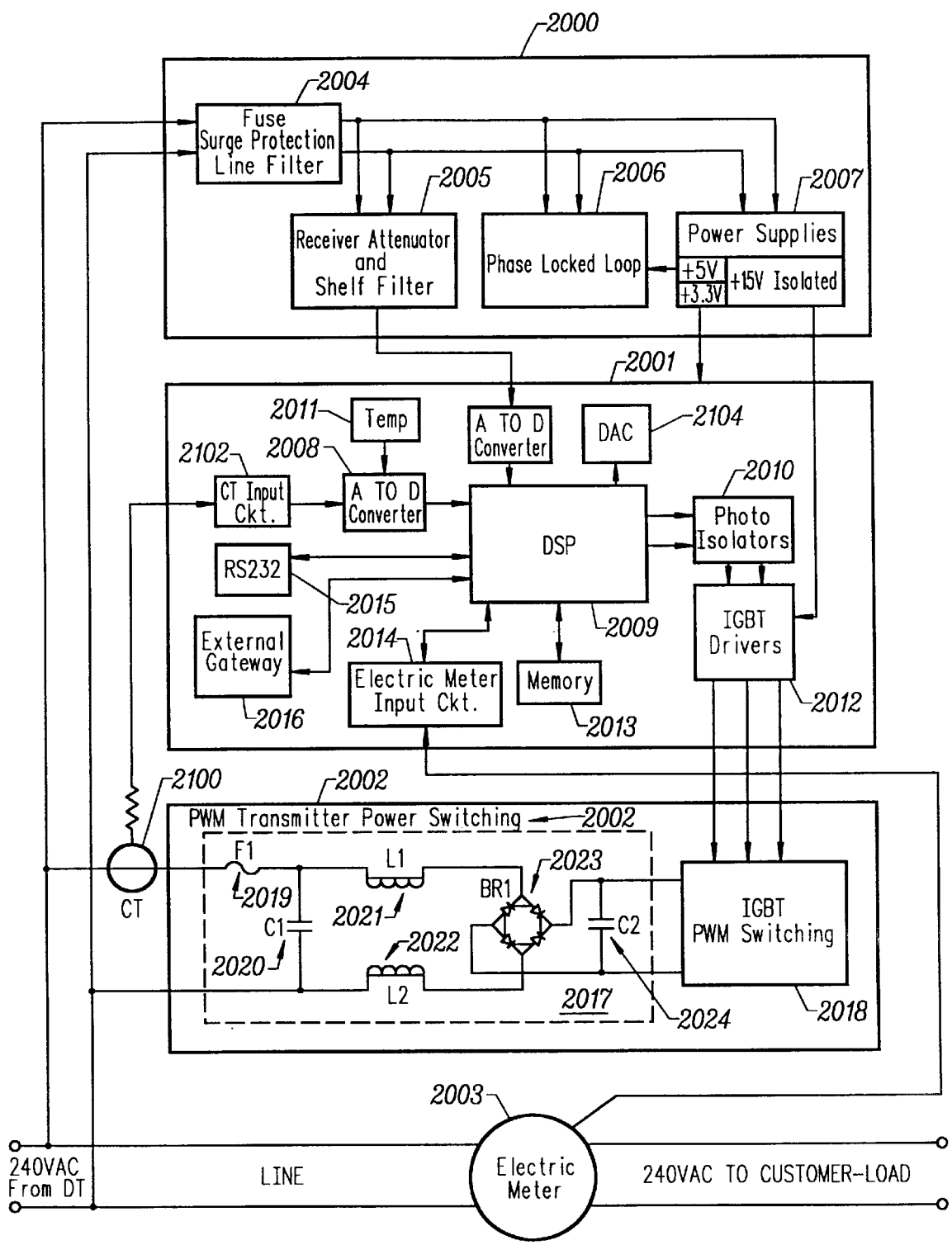
FIG. 20 illustrates remote node transceiver circuitry that may be used in accordance with an embodiment of the invention.

FIG. 13 is a drawing of a PWM current pulse 1240, illustrating the three specific pulse shaping time periods utilized by the controller firmware in the generation of a digital high data bit current pulse. The first time period is the attack period. During this period the PWM transmitter power switching section 2002, FIG. 20, is turned on for nearly the entire attack time period to allow the current to build up to the desired current pulse amplitude. The second time period is called the sustain period where the current amplitude is maintained at a nearly constant value by controlled PWM switching in the IGBT PWM switching circuit 2018, FIG. 20. This methodology will be discussed in greater detail below. The third and final current pulse time period is called the decay period, where the current is gradually reduced to zero in small steps by controlled PWM switching. This incremental reduction in current flow, and thus in the distribution transformer 303 secondary, minimizes the V=L×di/dt voltage produced in the leakage inductance of the distribution transformer 303. An example of the distribution transformer secondary line voltage 1242 is shown in FIG. 13 with the PWM generated current pulse. During the current pulse time periods, for each data bit time slot in each half cycle, the distribution transformer secondary sinusoidal voltage waveform can be at any value from zero crossing to the waveform peak value. Since it is desirable to maintain a specific data bit current pulse amplitude for each digital high data bit, special PWM control algorithms were developed to minimize current pulse amplitude variations in each allocated data bit time slot position through both half cycles of the 60 Hz waveform. Control algorithms developed for the remote node transmitter include techniques allowing variable attack time periods and variable sustain time periods for different bit positions in the 60 Hz half cycle. In addition, PWM control algorithms include specific calculations of the incremental decay steps for the decay time period, allowing a variable decay period length depending on bit time position. These techniques are described in greater detail below, in connection with PWM control.

Figure 14:
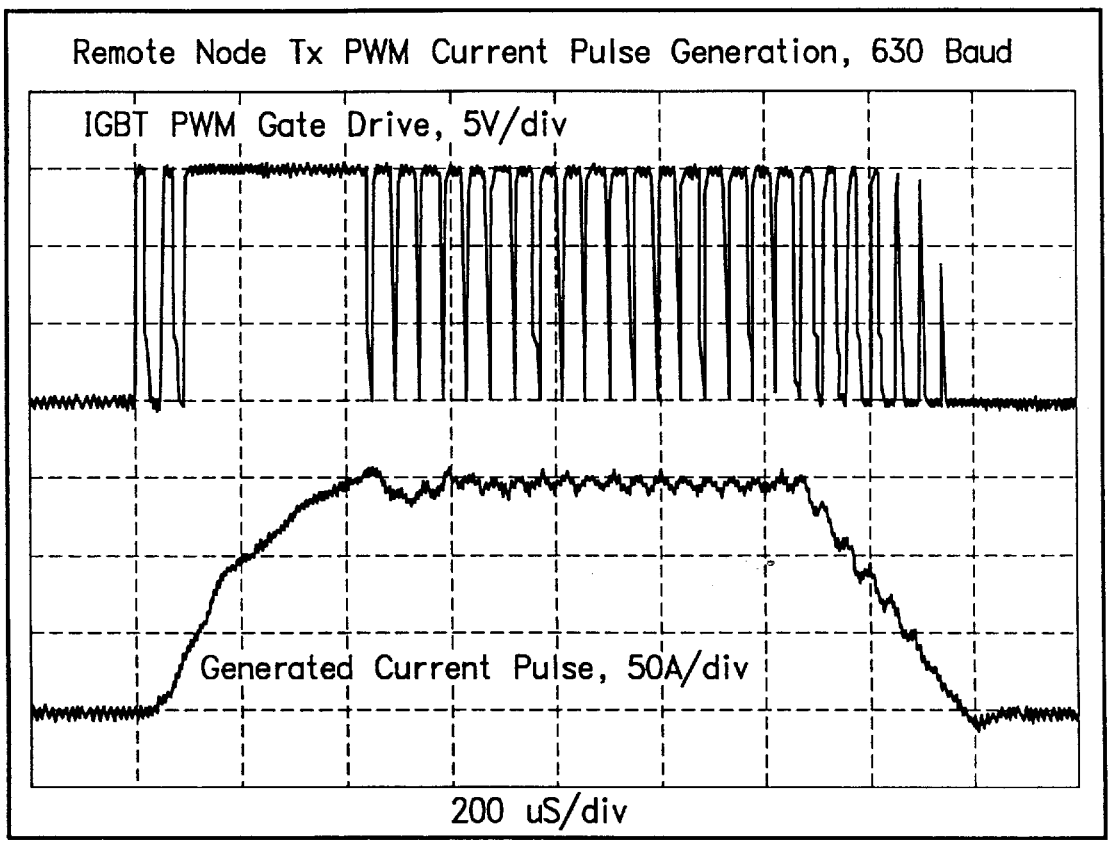
FIG. 14 is an oscilloscope waveform display of a gate drive signal in a remote node transmitter and the resulting pulse width modulation current pulse generated for data transmission.
Figure 15:
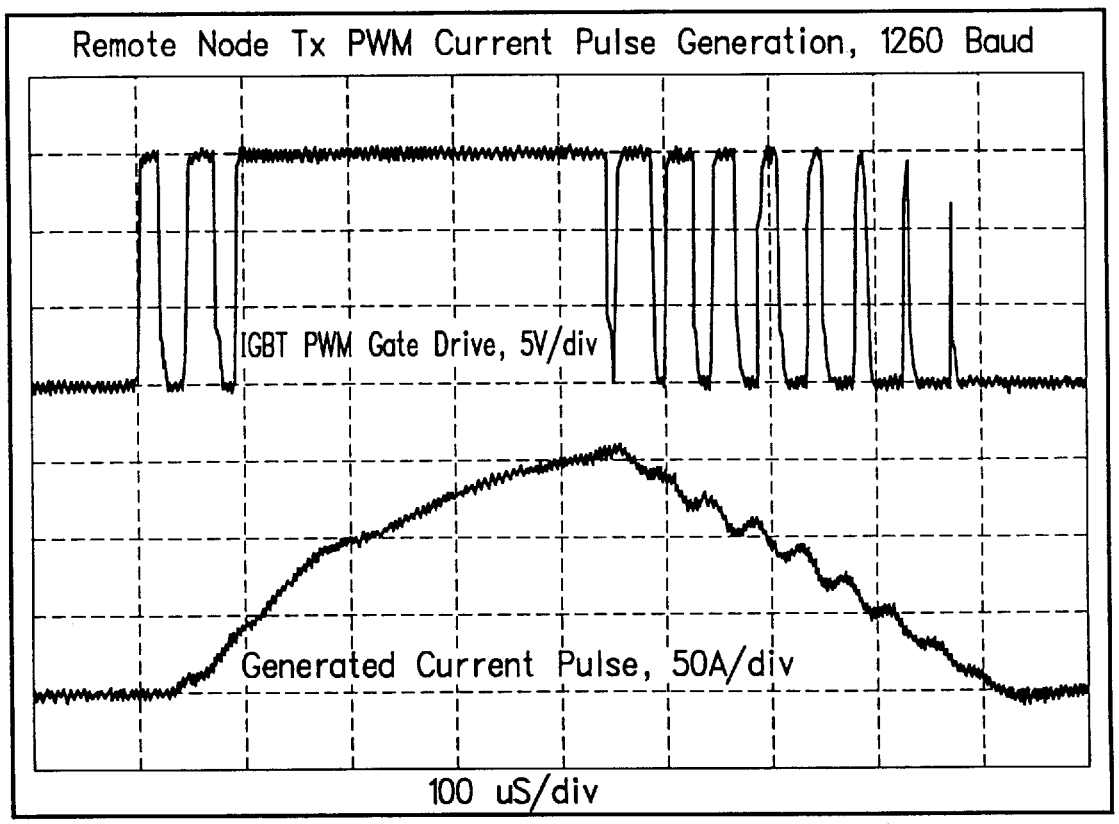
FIG. 15 is an oscilloscope waveform display of a gate drive signal in a remote node transmitter and the resulting pulse width modulation current pulse generated for data transmission.

FIGS. 14 and 15 displays two oscilloscope waveform plots of PWM pulse generation signals. FIG. 14 is shown for a 630 baud data rate, and FIG. 15 is shown for a 1260 baud data rate. Total data bit width shown in FIG. 14 for 630 baud is 1.587 ms, and the total data bit width shown in FIG. 15 for 1260 baud is 794 us. The top waveform in each display shows the gate drive signal applied by the DSP controller 2009, FIG. 20, through the IGBT drivers 2012, to the IGBT PWM switching circuit 2018. The bottom waveform in each display shows an actual data 1 bit current pulse generated by this PWM control process. In each display, the attack time period can be clearly seen during the time when the current pulse ramps up to the desired 150 A amplitude (see FIG. 13). This is indicated by the constant +15 V applied to the gate driver, shown in the top trace.

A current amplitude sustain time period (see FIG. 13) can be seen in the top display in FIG. 14, at 630 baud, during which the current pulse amplitude remains constant at 150

A, while the line voltage is changing sinusoidally. Controlling the duty factor (DF) of the PWM drive signals to the IGBT PWM switching circuit 2018 produces this constant amplitude current flow into the remote node transmitter from the distribution transformer 303. Each data bit is divided into smaller time increments called PWM intervals. The PWM interval frequency is 22,050 Hz or 45.35 us duration for each PWM interval. For a data baud rate of 630, or a data bit width of 1.587 ms, each data bit is subdivided into 1.587 ms/45.35 us or 35 PWM time intervals. A duty factor, DF, or ratio of ON time to the total cycle time for the IGBT branch switches 2018, is computed for each PWM time interval, required to sustain the data bit current pulse amplitude at the desired level. Since the distribution transformer 303 secondary voltage amplitude is varying sinusoidally in time, the required DF increases (for decreasing line voltage) or decreases (for increasing line voltage) for each PWM interval during digital high data bit generation. By varying the PWM DF during each data bit, the bit current amplitude can be maintained, or throttled, through the entire width of the data bit. This PWM methodology is described in greater detail below.

In FIG. 15, at 1260 baud, no sustain time period exists, since the data bit width is too short to allow a sustain time period, while still allowing a decay time period. In this case, the decay time period is given a higher priority to maintain an incremental current amplitude ramp down, and thus controlled di/dt pulse shaping. The decay time period can be seen in both displays, where the current pulse amplitude is ramped down to zero. During the decay time period the DF of the PWM intervals successively decreases, gradually reducing the current flow in the transmitter. This can be seen in FIG. 14, in the top IGBT gate drive trace. During the decay time, the last 7 PWM ON/OFF pulses, the small PWM pulse intervals can be seen to narrow progressively. This indicates a shorter ON time for each successive PWM interval.

If a digital high data bit is followed by a digital low data bit, the current is ramped down to zero amps by the PWM decay period methodology described above. If a digital high data bit is followed by another digital high data bit, the sustain time period is continued into the next bit, maintaining the desired current pulse amplitude using the PWM DF control described above. At the end of the second digital high data bit, if a digital low bit follows, the current is then ramped down during a normal decay time period.

Attention now turns to PWM control techniques that may be used in accordance with the invention. The invention utilizes unique techniques to generate the desired current pulse shape and amplitudes at the various time slots in each 60 Hz half cycle. These algorithms produce the IGBT drive signals, incorporating the PWM DF, attack time duration, and decay period control described above. A different set of conditions exists at each bit position since the amplitude of the sinusoidal voltage waveform changes with time. The DSP controller calculates the required attack time, the DF of the sustain time period PWM interval, and applicable rules for implementing the decay time period current ramp down. Each of these techniques, unique and specific to the PWM transmitter, is also dependent on the predetermined and desired current pulse amplitude.

Figure 16:
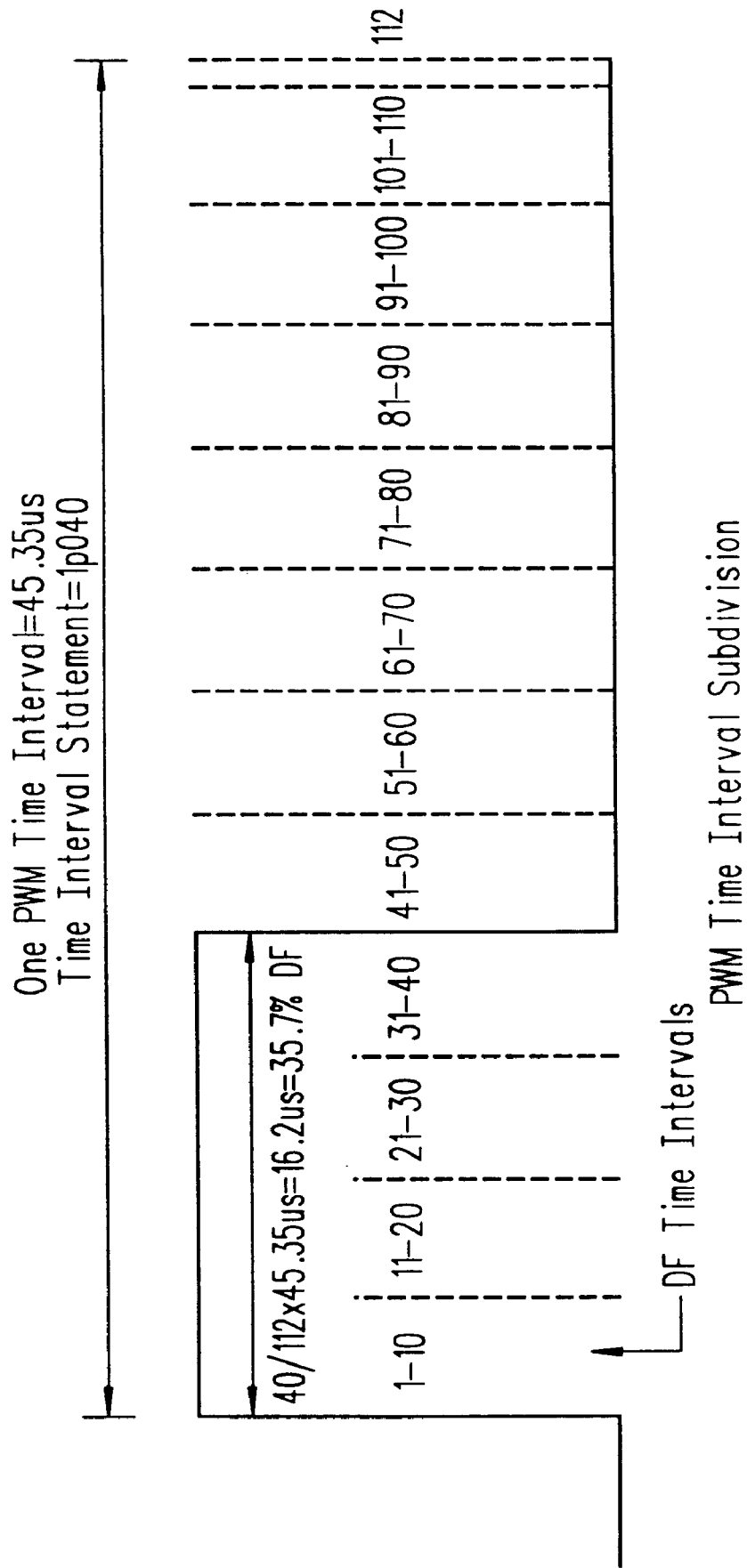
FIG. 16 illustrates the subdivision of one pulse width modulation time interval into smaller duty factor time intervals.

As described above, data bit time periods are subdivided into PWM intervals of 1/22,050 or 45.35 us each. Since it is necessary to vary the DF, or ratio of ON to OFF time of each PWM interval, the PWM interval is further subdivided into 112 time slots. FIG. 16 illustrates the subdivision of one PWM time interval into 112 smaller DF time intervals. Each DF time interval is 45.35 us/112 or 404.9 ns. This DF time, 404.9 ns, represents a multiple of the clock cycle time period in the remote node transceiver DSP 2009, resulting in the PWM period being subdivided into 112 time intervals. For the purposes of clarity, every 10 or so of the total 112 DF time intervals are shown in FIG. 16. A single PWM pulse is shown in this drawing, with a duty factor, ON period vs. total PWM period, equal to 40 of the total 112 DF time intervals. This results in a 40/112 or 35.7% DF for this individual PWM pulse. As described above, a data bit is made up of several PWM intervals (35 of them for 630 baud), each with its own calculated DF. By varying each individual PWM interval DF, the data bit current amplitude is maintained at a desired level during a data bit sustain time period, or decreased during the bit decay time period.

To develop the attack, sustain, and decay time period PWM control algorithms, a base reference point was established at a current pulse amplitude of 150 A. This is the highest expected operating current pulse amplitude in the remote node transmitter. After developing successful PWM control methods and equations for the 150 A attack, sustain, and decay periods, this base of information was used to develop equations defining the required PWM control algorithms during these time periods for any other desired lower operating current level. Using actual PWM transmitter circuitry, the attack times required for the current, flowing from the distribution transformer 303 into the transmitter circuit to build up to 150 A was measured at each point in the 60 Hz sinusoidal voltage waveform. These tests were performed with one or both IGBT branches in the IGBT PWM switch 2018, FIG. 20, turned on full time (100%DF). As will be described below for the IGBT PWM switches 2018, determination of which IGBT is turned on for attack time current build up depends on the bit position in the voltage waveform. The measured attack time intervals (microseconds) required at each voltage waveform position to reach 150 A were recorded in terms of the quantity of PWM intervals required.

For example, a required attack time interval of 544.2 us represents 544.2 us/45.35 us or 12 PWM time intervals. These recorded PWM time interval numbers are referred to in the PWM algorithm equations as a variable "N". In these equations and PWM operating code, a data bit is constructed of several successive PWM interval statements. Each interval statement is represented as NpDDD where N is the number of successive PWM intervals, within a data bit, with each PWM interval being turned ON for a quantity of DDD duty factor (DF) time intervals. The letter "p" in the statement is simply a separator between the two parts of the statement. Referring to FIG. 16, a DDD of 040 would relate to the pulse shown in this drawing, turned ON for 40 of the total 112 available DF time intervals. The PWM interval statement for this one pulse is 1p040. If a PWM interval statement was 12p112, this would represent a time period of 12 PWM intervals (N=12), or 12×45.35 us=544.2 us, with each PWM interval having a DF of 112/112 or 100%. In this case, the IGBT is turned ON continuously, no PWM throttling, for the 544.2 us time duration. Similarly, a PWM interval statement of 1p60 represents one PWM time interval (N=1), or 45.35 us, with a DF of 60/112 or 53.57%. In this case the IGBT is turned on for 60/112×45.35 us, or 24.3 us, out of the total 45.35 us PWM time interval. In this manner a data bit is constructed of several successive PWM interval statements, with each interval statement defining the PWM control necessary to construct a part of the data bit. For each data bit time period, the sum of all the N values in each PWM time interval is equal to the total number N in the data bit width. For a baud rate of 1225 baud, the bit width is 1/1225 or 816.33 us, which is made up of 816.33/45.35= 18 PWM time intervals. In this example, the total N=18. These 18 PWM time intervals are divided into several interval statements like those listed above to define the data bit. For example, a typical data bit could be defined as: 1p60, 1p80, 7p112, 1p90, 1p80, 1p70, 1p60, 1p50, 1p40, 1p30, 1p20, 1p10. This data bit is comprised of 12 PWM interval statements, each containing a PWM interval number N, and a duty factor time interval quantity DDD (NpDDD). The sum of all the N values, 1+1+7+1+1+1+1+1+1+1+1+1=18, which is the total number of PWM time intervals for this bit (1225 baud).

Following the measurement and recording of the required attack time, equations were developed that are used in the PWM control algorithms for calculating 1) required attack time for different data pulse current amplitudes, 2) the duty factor DF (DDD) required for the sustain time period, and 3) the decay time period current ramp down process. The DSP controller in the remote node transceiver uses these equations to implement the PWM pulsing algorithms for the construction of a data bit. The PWM control equations of the invention are as follows:

1. Attack time for current pulse levels lower than 150 A:

$$A_{new}=A_{old} \times (I_{new}/I_{old})^2$$

Where $A_{new}$ is the calculated attack time at the new current level;

$A_{old}$ is the 150 A attack time, defined at each voltage level in the 240 V sinusoidal waveform, expressed in terms of N, the quantity of PWM periods;

$I_{new}$ is the new desired data bit current pulse amplitude;

$I_{old}$ is the previously defined current, 150 Amps.

2. PWM duty factor, for each PWM interval within a data bit:

$$DF=\sqrt{[(I_{pulse} \times R_{coil})/V_{line}]}; \quad DDD=DF \times 112$$

Where

DF is the PWM duty factor required at a given line voltage $V_{line}$ to sustain a desired pulse current $I_{pulse}$; a number from 0 to 1;

$R_{coil}$ is the paralleled resistance of the IGBT branch coils;

DDD is the quantity of required duty factor time intervals, 0 to 112.

3. Decay time period current amplitude ramp down; the size of the incremental reduction, per interval statement, in the DF time interval quantity DDD (see FIG. 16), to implement current amplitude decay:

$$\Delta DDD=DDD_{prev}/(N_{avail}+1)$$

Where $\Delta DDD$ is the reduction in the duty factor time interval DDD number;

$DDD_{prev}$ is the quantity DDD in the NpDDD interval statement, immediately preceding the interval statement of the first decay period;

$N_{avail}$ is the total number of remaining PWM interval statements in the data bit available for the current pulse decay period.

As explained below, the total desired quantity of individual decay period PWM intervals, N, is 7 or 8 depending on the bit position in the voltage waveform. An example using 8 as the available PWM intervals would be as follows: $\Delta DDD=90/(8+1)=10$.

In this example 90 is the DF time interval number (90/112 or 80.4% DF) for the last PWM interval immediately preceding the first calculated decay interval statement (the last sustain interval, for example). The incremental reduction value, DDD, of the duty factor time interval is 10. Thus, the remaining 8 decay period interval statements would have a PWM interval quantity number N that reduces by 10 for each of the remaining 8 PWM time interval statements. For example: 1p80, 1p70, 1p60, 1p50, 1p40, 1p30, 1p20, 1p10. This accomplishes an 8 step current amplitude decay, with each step having a duration of 1 PWM period, or 45.35 us.

Certain additional PWM algorithm rules were developed to adjust the duration of the attack, sustain, and decay time intervals. These three time intervals, as shown in FIG. 13, cannot remain fixed in duration for each data bit, due to the sinusoidal amplitude variation in the DT 303 secondary voltage. Since the overriding objective for a data bit is to reach a desired current pulse amplitude, the attack time must be given priority over the other two time intervals. This is the reason for developing and recording the number of required attack time intervals (in terms of PWM intervals, N), to reach 150 A, vs. voltage waveform position, and then developing equation number 1 above, the required attack time vs. other current levels. This produces a varying attack time duration for different bit positions in the voltage waveform—longer attack times for bit positions at lower voltage amplitudes, shorter attack times for bit positions at higher voltage amplitudes. Since a data bit must be a fixed time duration, for a given data baud rate, the total attack time (varying)+sustain+decay time periods must be the same for each bit. This obviously requires that the sustain and decay times are reduced, or increased accordingly to keep the total bit time fixed. Procedures incorporated into the PWM control algorithms for this process are include the following.

A required attack time is calculated, using the recorded table of attack times for 150 A current level; the actual attack time is then calculated for other current levels lower than 150 A, if necessary. Calculate: (The total available bit time)−(Required attack time, calculated in step1)= Remaining time available for the decay period (next highest priority), and the sustain period (lowest priority, if time available). If time is available for the decay period determined in step 2 above, the decay period PWM interval statements are generated, as described in the discussion above. Individual decay period statements, N=1 each in length, are assembled, up to a total of 7 or 8 decay period statements. This is the maximum number of desired decay statements required for a sufficient PWM current pulse decay process. This will be discussed in greater detail below, for IGBT branch switching. If the total number of available decay period PWM intervals, calculated in step 2 above, is less than the 7 or 8 desired intervals, then the algorithm uses the remaining number of PWM intervals to, however small, generate the best decay period possible in the available time remaining. In this case, there are no available sustain period time intervals, and the bit generation is complete.

If the total number of available decay period PWM intervals, calculated in step 2 above, exceeds the 7 or 8 desired intervals, then the algorithm uses the full 7 or 8 interval steps to generate the decay period control. Then, the remaining PWM time intervals, (total bit time)−(attack time)−(decay time), are used to generate the sustain time period control, using equation number 3 above to determine the DF for each remaining PWM time interval.

As the sinusoidal voltage (for the PWM remote node transmitter), or current (for the substation transmitter), waveform amplitude approaches zero, maintaining the desired bit amplitude becomes increasingly difficult due to the decreasing (distribution system) waveform amplitude that produces the bit voltage or current. Transmitter controller algorithms, discussed above, maximize the use of the low amplitude portions of the waveform to produce desired data bits. However bit time slots near, or passing through, zero crossing will be much lower in amplitude due to the lack of voltage or current to produce the data bit. Attempts to recover data bits strictly as they are transmitted in these near zero crossing regions would produce frequent bit errors. For this reason, one of two possible techniques, unique to the invention, is used to lower the overall message bit error rate by uniquely accounting for data bits transmitted in these bit positions. These two techniques are called Bit Combination, and Bit Exclusion.

Figure 17:
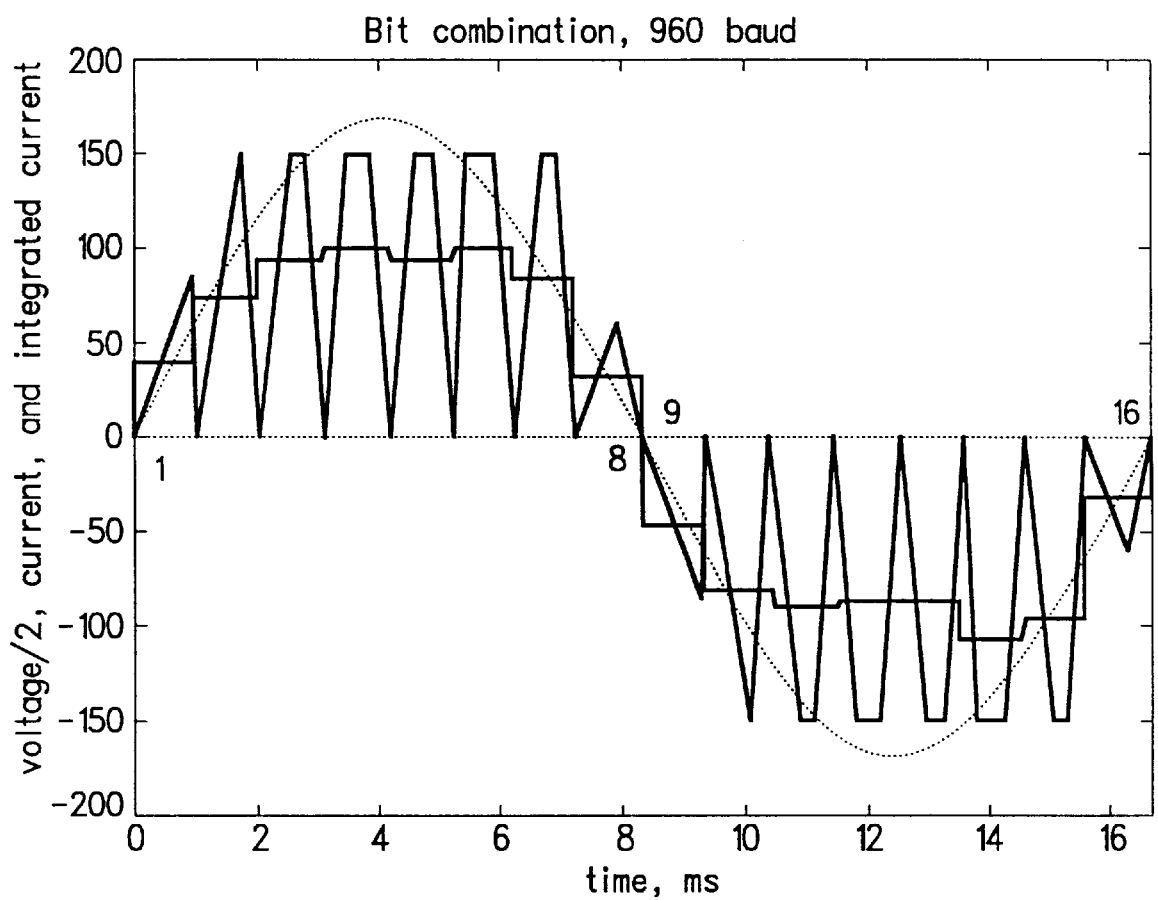
FIG. 17 illustrates a digital communication signal imposed on a power signal in accordance with an embodiment of the invention.
Figure 18:
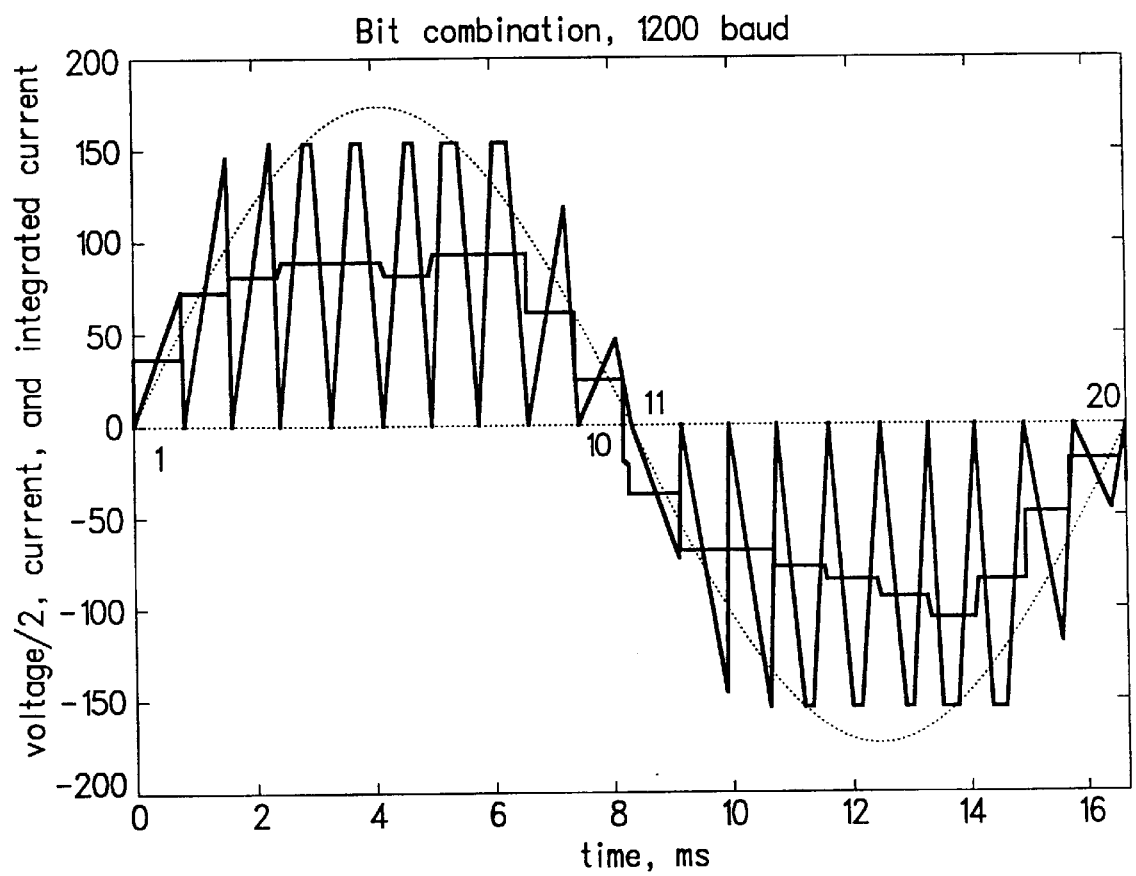
FIG. 18 illustrates a digital communication signal imposed on a power signal in accordance with a high data transmission embodiment of the invention.

FIGS. 17 and 18 are graphical waveform displays of adjacent digital high data bits, superimposed over one complete cycle of a 60 Hz sinusoidal waveform, for baud rates of 960 and 1200 baud. These displays illustrate individual bit position time slot allocations, and their relationship to the 60 Hz voltage or current waveform available in the inbound and outbound transmitters for bit generation. The trapezoidal shaped pulses shown in these diagrams are the data bits generated by the remote node transmitter. However, this discussion of bit combination and exclusion also applies to the substation transmitter bit conversion process.

For 960 baud as shown in FIG. 17, there are 8 data bit positions for each 60 Hz half cycle, and 10 bit positions in each 60 Hz half cycle for 1200 baud. The sloping sides of these pulses represent the data bit attack and decay periods described above. The third graphical line in each drawing, seen as incremental steps for each data bit, represents the level produced in the data receiver by integrating the energy over the duration of a data bit for any given bit position in each half cycle. As seen in these drawings, data bits near a 60 Hz zero crossing are lower in amplitude, and require the entire bit duration for an attack period (no flat top sustain period). This results is a lower available integrated bit energy, as shown in the drawings for each bit position. The digital data receiver determines whether the recovered data bit is a logic 0 or 1, based on the integrated bit energy level, and a level threshold. Data 1 bits near zero crossing could therefore be falsely detected as data 0 bits, due to this lower recovered energy.

Two methods were specifically developed in accordance with the invention to account for the near zero crossing data bits. The first method is called bit exclusion. In this technique certain bits are predefined as "excluded" bits for each data baud rate used, and are ignored by the communications system. Since the ADPLC system utilizes 60 Hz waveform synchronization and wave tracking, these near zero crossing bit positions are automatically identified for a given baud rate, and are ignored by the inbound and outbound transmitter and receiver controllers. No data bit is assigned, transmitted, or detected in these bit positions. In FIG. 17, bits in positions 1, 8, 9, and 16 would be excluded due to their low amplitude. In FIG. 18 the excluded bits would be in positions 1, 10, 11, and 20. Bit exclusion represents the more drastic of the two methods, since bit errors in these positions are avoided by ignoring these bits. The obvious cost of this method is the corresponding reduction in system bit transfer rate.

The second method is called bit combination. Rather than deleting lower amplitude bits from system operation, they are combined with other adjacent low amplitude bits, and treated as one single bit. In FIG. 17, the two bits adjacent to zero crossing, bits 8 and 9, are combined into one bit, allowing the digital receiver to integrate the energy contained in both bit positions. Bit 16, at the next zero crossing, would be combined with bit 17, and continue in this manner for succeeding cycles. In FIG. 18, the combined bits are in positions 10 and 11, 20 and 21, etc. In each drawing, bit 1 would be combined with the last bit in the preceding cycle. While the energy for each of the two combined low amplitude bits is smaller than for other bits, the combined energy for both bit positions can be comparable to the energy for "normal" bits. Using this technique, these low amplitude bits are not lost, which maximizes the system bit transfer rate.

Figure 19:
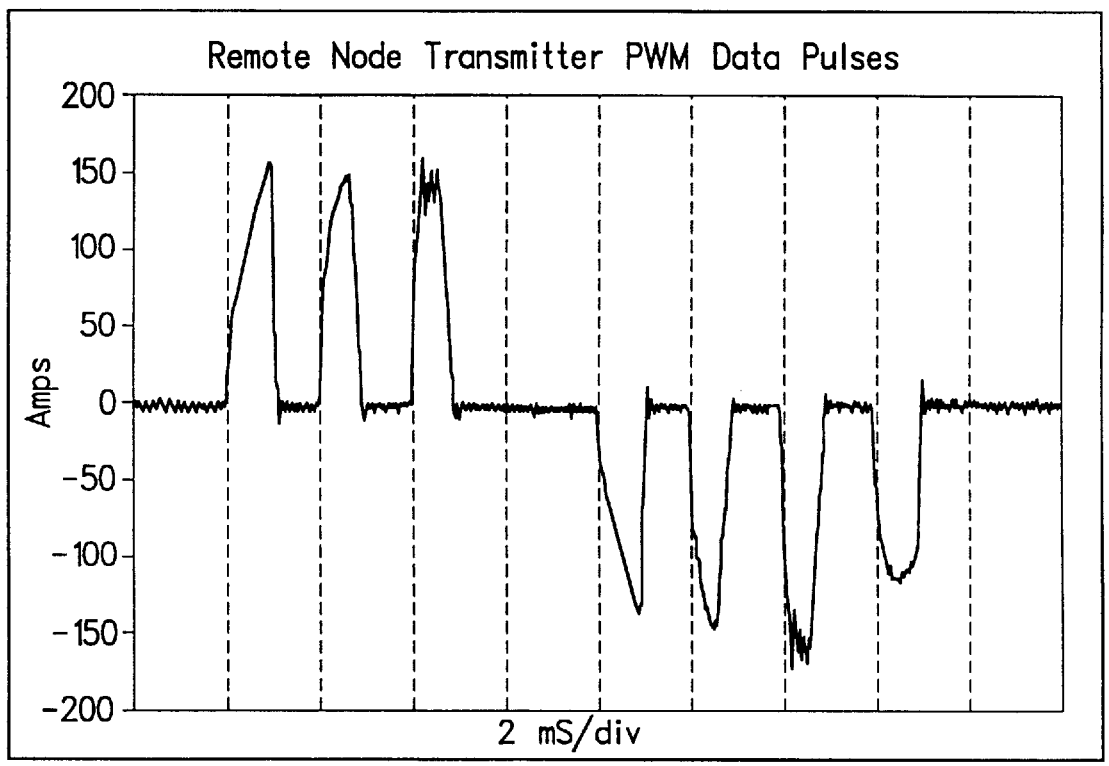
FIG. 19 is an oscilloscope waveform showing remote node transmitter data current pulses in the secondary of a distribution transformer.

FIG. 19 is an oscilloscope display of several PWM current pulses generated by a remote node PWM transmitter. For clarity, the data bits generated are alternating digital high and digital low data bits. Bits near zero crossing can be seen to be lower in amplitude than bits at higher amplitude points in the 60 Hz cycle.

FIG. 20 is a block diagram of a remote node transceiver, illustrating three functional circuit sections: (1) power supplies, PLL, receiver signal extraction 2000; (2) signal processing and control 2001; and (3) PWM transmitter power switching 2002. The power supplies, PLL, receiver signal extraction circuit 2000 includes a power conditioning block 2004, which is connected to a 240 V secondary side of the distribution transformer 303. The power conditioning block 2004 contains a fuse for transceiver power interruption in the event of an over-current condition in the power transmitter, an MOV for transient voltage protection, and line filtering for rejection of high frequency noise. The output of this section 2004 remains at the full 240 Vrms line voltage, and connects to the receiver attenuator/filter 2005, the synchronization PLL 2006, and the transceiver power supplies 2007.

The receiver attenuator and shelf filter 2005 represents the input to the remote node receiver circuitry. The distribution system voltage at the distribution transformer 303 secondary contains both the low level data signals and the high level voltage (240 V) for customer load power service. Therefore, significant attenuation must be applied to the 60 Hz fundamental power line frequency component, and at least some of its odd harmonics to reduce the composite voltage waveform to a level that can be applied to the receiver's A-to-D converter 2008. Since data transmitted from the substation transmitter is a very low amplitude ($1/120^{th}$) compared to the distribution system operating voltage, it is also desirable to present as little attenuation to the data frequencies as possible. For this reason, an R/C shelf filter is included in the attenuator, which presents a high pass frequency response to reduce the circuit attenuation at higher frequencies that contain most of the total data information. The attenuator/filter section 2005 attenuates the composite waveform of the 60 Hz, 240 Vrms line voltage to a level of approximately 2 Vp-p before passing the signal on to the A-to-D converter 2008 for waveform sampling.

Phase lock loop (PLL) circuit 2006 provides an output signal that is phase locked to the distribution voltage waveform at the distribution transformer 303. This phase locked signal provides 60 Hz power frequency synchronization and location of the phase voltage zero crossing points for the DSP receiver. Since each outbound data message is synchronized to and begins at a 60 Hz distribution voltage zero crossing point, the DSP receiver utilizes this 60 Hz waveform synchronization as a reference point for conducting a search for a valid data message.

Power supply circuit 2007 contains two separate AC-to-DC linear power supplies that are isolated from one another. A 3.3 V DC power supply provides operating power to the signal processing and control electronics 2001. A +5 VDC power supply provides operating power to the PLL circuit 2006. A separate and isolated +15 V power supply provides operating power to the IGBT drivers 2012.

The data receiver signal processing and control block 2001 receives output from the receiver attenuator/filter 2005 and applies it to A-to-D converter 2008. This 16 bit A-to-D converter performs continuous real-time waveform sampling on the composite distribution voltage waveform. This voltage waveform, including data, is sampled by A-to-D converter 2008 at 12,600 samples per second. This sampling rate is a multiple of the 60 Hz line frequency, and its $3^{rd}$, $5^{th}$, and $7^{th}$, harmonics, computed as 60 Hz×3×5×7×2=12,600. This provides an integer number of A-to-D samples for each period of these individual frequency components, required for highly effective comb filtering of the 60 Hz fundamental frequency, and individual harmonic components in the DSP signal processing. Data recovery techniques performed in the remote node receiver through digital signal processing are essentially the same as the techniques described above in connection with FIG. 12 for the substation data receiver 306. In other words, the functional operation of both the substation receiver 306 and the receiver portion of the remote node signal processing and control section 2001 are essentially the same. This operation, while shown in FIG. 12, is more fully appreciated with reference to FIG. 21.

Figure 21:
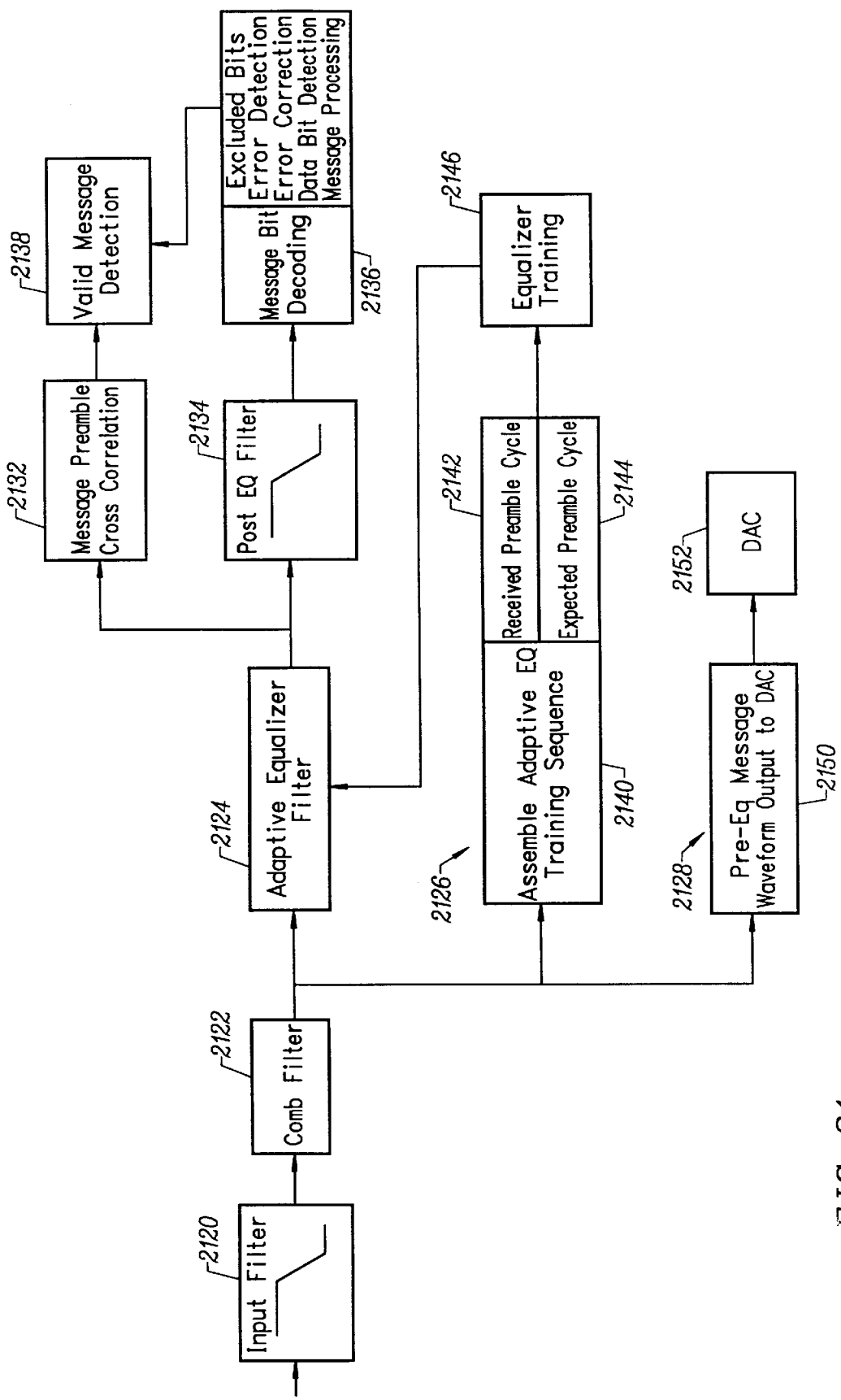
FIG. 21 illustrates a digital signal processor configured to perform processing in accordance with an embodiment of the invention.

FIG. 21 illustrates a digital signal processor (i.e., DSP 604 in FIG. 6 or DSP 2009 in FIG. 20) configured to perform processing in accordance with an embodiment of the invention. Each block shown in FIG. 21 can be considered a block of computer code executed by the digital signal processor. Thus, the reference to a module or routine below implies a set of computer code used to perform a specified function.

The input to the digital signal processor is a digital signal from an analog-to digital converter (i.e., analog-to-digital converter 604 in FIG. 6 or analog-to-digital converter 2008 in FIG. 20). The digital signal is initially applied to an input filter procedure 2120, which applies a low pass and band shaping filter to remove undesired high frequency and noise components. The output of the filter 2120 is passed to a comb filter module 2122, which removes unwanted 60 Hz and harmonic components from the composite input waveform. Operation of the comb filter is described in connection with the discussion of FIG. 12.

The output of the comb filter module 2122 is a signal comprised of the data bit stream and non-synchronous noise components. From this point, the digital signal processor operation is split into three separate parallel branches: a primary data bit processing branch 2124, an adaptive filter training process branch 2126, and a pre-equalized data bit branch 2128.

The primary data bit processing branch 2124 includes an adaptive equalizer filter module 2130, which applies a trained adaptive filter equalizer to the data bit stream. The function of the filter is the inverse of the inbound current transfer function, or the outbound voltage transfer function of the distribution system. Ideally, the shape of the data bits at the output of the equalizer filter 2130 is equal to the original shape of the bits as transmitted by the substation or the remote node transmitters. As shown in FIG. 21, the adaptive equalizer filter module 2130 is applied to the data prior to performing the correlation of the message preamble with the expected preamble in the adaptive filter training process branch 2126. This filter equalization optimizes the shape of the data bits, while minimizing unwanted signal components due to distribution system effects, which in turn minimizes the difference between the actual and ideal correlation function outputs. Applying the trained equalizer to the data prior to correlation improves detection of valid messages by making valid message preambles more closely match the expected preamble signal.

The output from the adaptive equalizer filter 2130 is applied to a cross correlation routine 2132. A cross correlation function is performed on the first cycle (preamble) of the data message using the transmitted (ideal) data message preamble. The result of this function will significantly increase in magnitude when a data preamble is present, and the location of the magnitude peak provides time alignment with the transmitted preamble. The occurrence of a peak in the correlation output determines the presence of a potentially valid preamble. The exact time position of the correlation peak with respect to the known zero crossing points in the 60 Hz bus voltage waveform establishes a critical timing position to which all succeeding bit processing is referenced. Tracking, with respect to the PLL signal referenced to the bus voltage, of the outbound data bit shifts caused by power factor changes are managed by the inherent characteristics of the correlation process. If the outbound preamble bits shift within the bus voltage waveform due to a power factor change, the correlation peak experiences a corresponding shift, which establishes a new bit recovery reference point. In this manner, the digital signal processor receiver is able to track the position of the data message preamble.

The post equalization filter routine 2134 operates as a low pass filter to remove unwanted high frequency components prior to bit recovery. The bit decoding module 2136 performs the remaining data bit recovery. By way of example, this data bit recovery may include an integrate and dump process to produce an output corresponding to the energy contained in each sampled data bit. The bit decoding module 2136 may also perform bit threshold detection by using a preset bit amplitude threshold to discriminate between logical ones and logical zeros. The bit decoding module 2136 preferably removes excluded bits from the bit stream. The module 2136 may also include error correction circuitry. An embodiment of the module 2136 includes a checksum error detection component to compute the checksum of the received message and compare it to the received checksum and thereby detect errors. Finally, the bit decoding circuit preferably performs data message decoding to check the recovered message for content and/or instructions to be performed by the receiver. The final block of the primary data bit processing branch 2124 is a valid message 2138, which is produced by the processing performed by the primary data bit processing branch 2124.

The adaptive filter training process branch 2126 includes an adaptive filter training routine 2140, which assembles two properly aligned patterns of data bits that are used for equalizer training. One pattern is the first preamble cycle of the received data message 2142. The second pattern is composed of the synthetic or expected preamble data bits 2144. These two patterns are assembled so that the received data bits are aligned with the bits in the synthetic pattern. An equalizer training module 2146 compares the two bit patterns from the adaptive filter training routine 2140 to produce an equalizer filter that ideally replicates the magnitude and phase frequency response required to restore the shape of the actual received data bits to the bit shape of the ideal bit pattern. The resulting filter is then applied to the incoming data bits in the adaptive equalizer filter module 2130

The pre-equalized data bit branch 2128 includes a pre-equalized data bit processor 2150 to produce pre-equalized data bits. These data bits are then applied to a digital-to-analog converter 2152. The analog output from the digitalto-analog converter 2152 allows for signal viewing on external signal monitoring equipment. This facilitates evaluation of the adaptive filter equalizer performance by comparing pre-equalization and post-equalization waveforms.

Returning to FIG. 20, outputs from the DSP 2009 are connected to the photo isolators 2010, which provide electrical isolation between the signal processing and control section 2001, and the PWM transmitter power section 2002. This isolation is required since the PWM transmitter power section 2002 is directly connected to, and referenced to, the DT (303) 240 VAC secondary conductors. Signal processing and control circuitry 2001, however, is referenced to a different electrical point, preventing the sharing of a common connection between these two sections. One photo isolator is provided for each of the three IGBT power switches in the IGBT switching circuit 2018. A non-volatile, flash memory integrated circuit 2013 provides operating program code storage for DSP 2009 operation. Electric meter input circuit 2014 is used to detect rotation of the electric meter rotor, allowing the DSP 2009 to measure and record the electric power consumption of the meter's load. An RS232 circuit 2015 provides a serial communications port to the DSP 2009. In this manner, an external PC can communicate with the transceiver for testing, control, or to download modified operating firmware to the DSP 2009.

Current Transformer (CT) 2100 measures the transmitted data pulse current and provides an output to CT input circuit 2102 proportional to the amplitude of the generated data pulses. The CT input circuit 2102 applies low pass filtering, scaling, and transient protection to the input signal. The analog-to-digital converter 2008 receives an input signal from the CT input circuit 2102. This 12 bit analog-to-digital converter samples the current pulse and provides a digital output which allows DSP 2009 to monitor and stabilize variations in data pulse peak current amplitude due to variations in the distribution transformer leakage inductance. Temperature sensor 2011 also provide an output to the analog-to-digital converter 2008 allowing DSP 2009 to monitor the ambient temperature immediately surrounding the transceiver circuitry. Digital-to-analog converter 2104 converts digital signals from DSP 2009 to an analog output that can be monitored by external test equipment for circuit testing.

Several controller board signals are combined into an external gateway connection port 2016, which provides the signals necessary to allow the DSP 2009 controller to communicate with a variety of external devices. One such interface application allows the transceiver to communicate with a CEBus modem operating in a local 120 VAC power line communication system, located in a residential or commercial facility. This would allow the system to communicate status information and control commands between a central office location, linked through the substation PC, and remote customer devices. External gateway port 2016 also allows interfacing to other devices for implementation of a variety of additional electric utility provided services.

Outputs from the photo isolators 2010 are connected to the IGBT drivers 2012. These drivers provide interfacing from the photo isolators 2010 and provide the high pulse current drive signals, 0 volts to +15 volts, required by the IGBT PWM switches 2018.

The PWM Transmitter power switching section 2002 implements the high power data current pulse transmission into the secondary side of the distribution transformer 303. A fuse 2019 (F1) has been carefully selected to allow a normal data message, with current pulses up to 150 A, to be transmitted. In the event of a circuit or firmware failure, causing abnormally high current levels or abnormal bit content, the fuse 2019 interrupts current flow in the power transmitter section. A high voltage capacitor 2020 (C1) and two inductors 2021 and 2022 (L1 and L2) form a PWM frequency L-C filter. This filter attenuates the 22.050 KHz PWM switching frequency component of the data bit current pulse generated in the IGBT PWM switching section 2018. This prevents the high frequency 22.050 kHz current flow from being conducted into the distribution transformer 303 secondary, preventing interference to distribution system loads connected to the distribution transformer 303. This filter also provides protection to the power transmitter components from distribution system line transients.

Bridge rectifier 2023 acts as a full wave rectifier to the 60 Hz voltage waveform, allowing the monopolar IGBT devices in the IGBT PWM switch 2018 to be utilized in each half cycle of the 60 Hz AC waveform, and thus permitting data bit generation throughout the entire 60 Hz cycle. IGBT PWM switching section 2018 contains three parallel connected IGBT branch circuits. Each branch circuit consists of a power air core inductor, fast recovery power diode and a high voltage, high current IGBT power semiconductor. As each IGBT device is turned on, current flow increases through the branch circuit, and into the transmitter from the distribution transformer secondary, during the attack time of a digital high data bit. As the desired current amplitude is reached at the end of the data bit attack time, the IGBT switching is pulse width modulated (PWM), as described in the PWM control discussion, to maintain a current pulse amplitude (sustain period), or ramp off the data bit current (decay period).

PWM Transmitter power switching circuitry 2002 of FIG. 20 is connected to the line side of the electric meter 2003. This avoids transmitter data bit current flow through the electric meter 2003, preventing any interference to the normal power consumption measurement by the meter.

The substation PC and transmitter prompt all non-alarm inbound message transmission from remote node transceivers. In this mode, the substation PC acts as a primary station with responsibility for controlling the operation of the communications link by issuing commands or requests to the remote node transceivers. Under normal operating conditions, the remote node transceivers act as secondary devices, entirely under the direction of the primary substation system. One exception to this normal polled response operation occurs for a remote node alarm condition. When an alarm condition is detected, the remote node transceiver independently initiates inbound communication to the substation receiver, reporting the alarm condition.

Normal system operation consists of an outbound query by the substation transmitter system to any remote node transceiver unit scheduled by the substation PC for interrogation. Outbound query transmissions can occur to implement various electric utility services such as: remote reading of customer electric, gas, and water meters; utility equipment status monitoring and control–fuses, reclosers, switches, etc.; distribution system automation; and load control.

Figure 22:
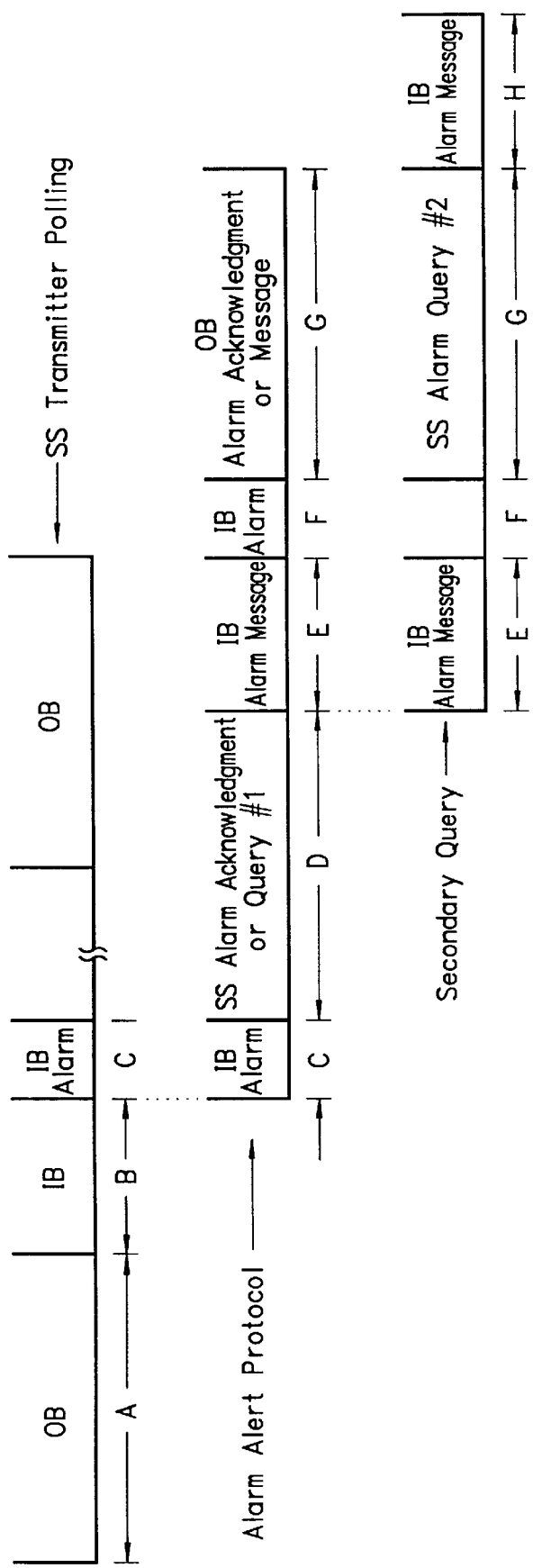
FIG. 22 illustrates a bi-directional communication protocol that may be used in accordance with an embodiment of the invention.

In one embodiment, the system protocol of the invention includes message field assembly and framing, remote node transceiver query, inbound and outbound communication management, and remote node alarm handling. An illustration of a typical bi-directional communication data exchange is shown in FIG. 22. In the first line labeled SS Transmitter Polling, an Outbound message is transmitted first, during time period A. An inbound response from the addressed remote node transceiver follows, indicated by time period B.

Following this polled query to and response from a remote node transceiver, a high priority alarm field time slot C is allocated. This time slot C is used by any remote node transceiver to inform the substation PC that a high priority alarm condition exists. Examples of high priority alarms are medical emergency, fire alarm, burglar alarm, etc. During this time, a remote transceiver can transmit an alarm alert to the substation receiver. The length of the alarm alert message transmitted during this time slot is kept as short as possible for two reasons: first, to maximize the number of times the remote node transmitter can send the alarm message before exceeding thermal limitations; second, to minimize system communication overhead, since one alarm field is allocated after each outbound/inbound field time period.

Figure 23:
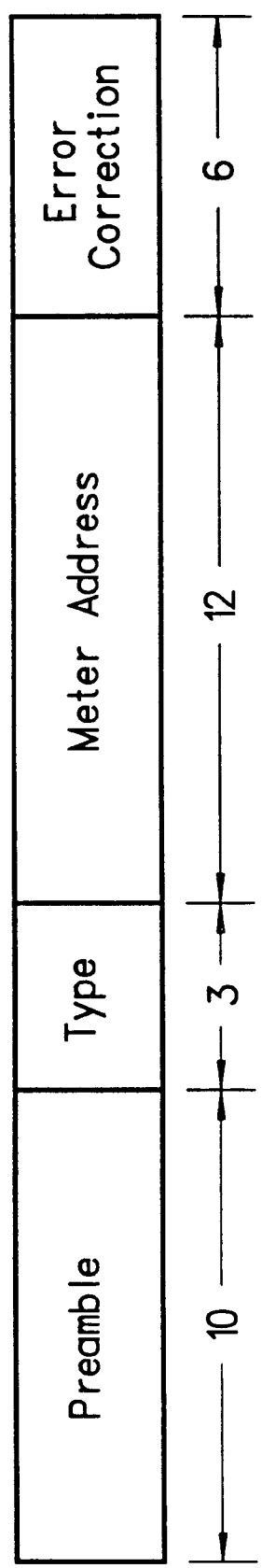
FIG. 23 illustrates a basic frame structure for a remote node alarm alert message frame utilized in accordance with an embodiment of the invention.

FIG. 23 shows a typical inbound alarm message frame containing a total of 31 bits. This frame is made up of several fields. The first field is the message preamble field, made up of 10 data bits. The specific bit content of the preamble is predefined, fixed, and known to the substation data receiver. This message preamble identifies a valid message to the data receiver. The 3 bit type field identifies the type of alarm message that is being transmitted. Examples of message types include: medical emergency, smoke or fire detected, break-in or other situation requiring police response, water or flood damage, industrial process or situation alarm, and special alarm conditions requiring substation query.

The meter address field provides the lower 12 bits of the full unique address of the individual remote node transceiver being polled. A 12 bit field allows $2^{12}$ or 4,096 different remote node transceivers to be addressed on an individual distribution circuit phase.

The 6 bits of the error correction field are included for the purpose of implementing error correction in the data receiver. Error correction encoding is applied to the type and meter address fields prior to message transmission. In the example of FIG. 23, these fields contain 15 data bits. One possible method of applying error correction encoding converts these 15 bits into 21 other bits. The error correction encoding process thus converts the original 25 bits into 31 transmitted bits, including the 6 error correction bits.

The second line in FIG. 22, labeled Alarm Alert, illustrates the message protocol in response to a remote node alarm alert, in time period C. Upon receiving an alarm alert in time period C, the substation transmitter issues an Alarm Acknowledge during time period D to the remote node unit that sent the alarm. In certain cases the time period D can also be used to issue an Alarm Query to a remote node transceiver to request more detailed alarm information. This would represent a more complex form of the alarm protocol to be used with remote node units configured for special alarm handling. In this case, time period E is allocated to provide a time slot for a more detailed alarm response by a remote node transceiver and to preserve the overall protocol format.

Following time period E, an additional inbound alarm alert time slot F is allocated to maintain proper protocol sequencing. An outbound alarm acknowledge message G is then sent to the remote node transceiver from the substation transmitter to acknowledge the receipt of the new alarm message F by the substation PC.

The third line in FIG. 22, labeled Second Alarm Query, illustrates the special case of alarm servicing from a remote node transceiver configured for detailed alarm information reporting. The Second Alarm Query occurs if the polled inbound alarm message E is not received properly by the substation PC. In this event, the substation PC sends a second Alarm Query #2 during time slot G and looks for an inbound alarm message H from the remote node transceiver.

If an alarm message is not received by the substation PC after a predetermined number of queries G, no further alarm query is sent. The assumption is that the remote node transceiver has made the maximum allowable attempts to send a full alarm message. This is a worst case thermal limitation for the remote node transmitter assuming a maximum ambient temperature of 150° F. inside the remote node transceiver enclosure. Under this worst case condition, the remote node transceiver must enter a cool down period of several minutes before attempting further transmission. At this time the burden for alarm reporting shifts back to the remote node transceiver, by requiring it to restart the alarm protocol at the beginning.

To ensure that no remote node transceiver site alarm is ignored, or eventually lost, a special alarm alert mode process was developed for the remote node transceiver. To preserve the integrity of the system alarm management, worst case distribution system data transmission conditions are assumed, preventing the successful recovery of the alarm alert C at the substation. Operating under this alarm management routine, the remote node transceiver continues to send its alarm alert to the substation PC until a valid outbound alarm acknowledgment D is received by the remote node transceiver. In this manner the remote node alarm service routine assures that the alarm will not remain unprocessed.

Figure 24:
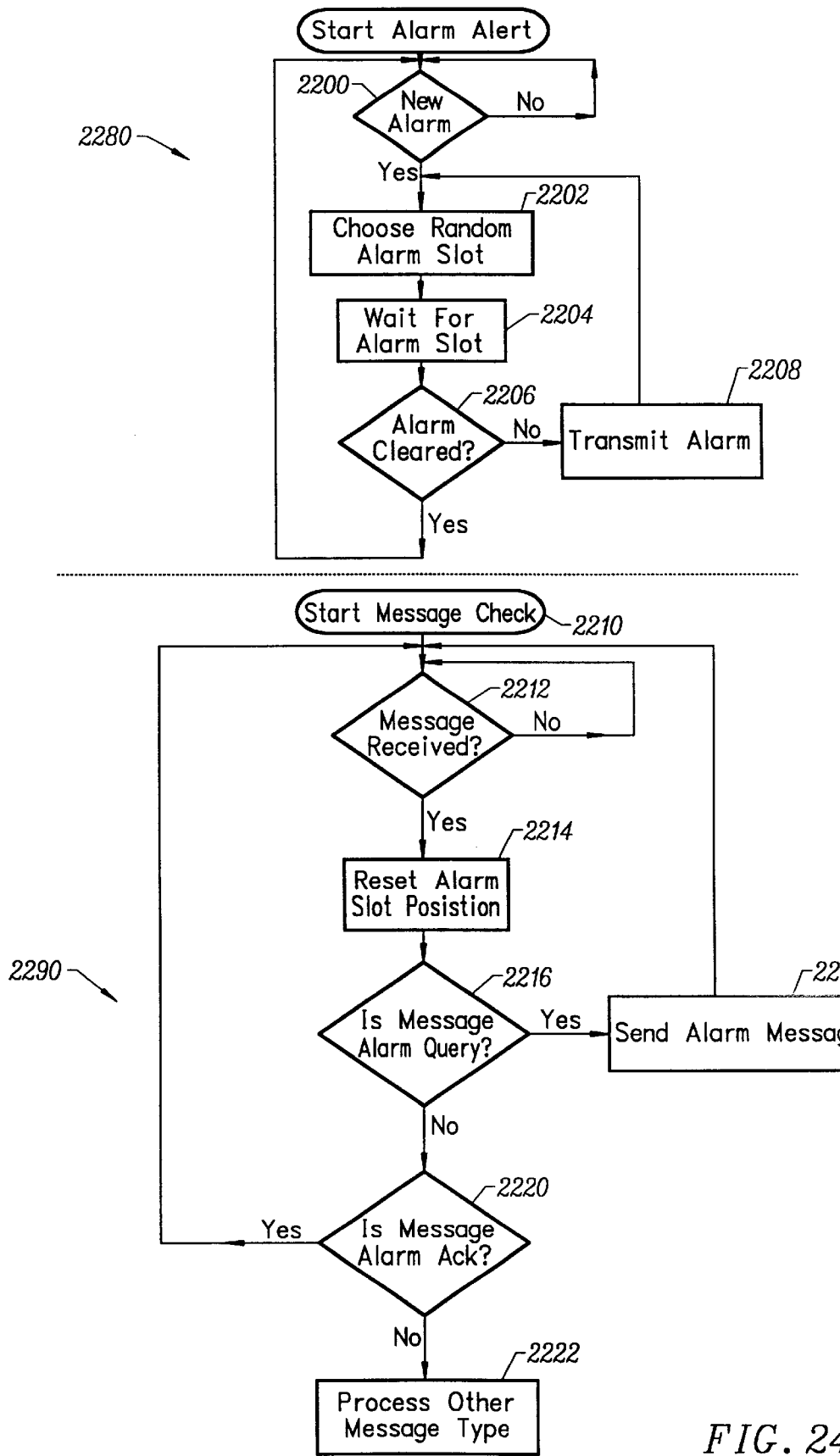
FIG. 24 illustrates remote node transceiver alarm service processing in accordance with an embodiment of the invention.

FIG. 24 illustrates the remote node transceiver alarm servicing routine described above. The first routine 2280 implements, and repeats, the retransmission of an alarm alert until the alarm is cleared by an outbound alarm acknowledgment. The second routine 2290 checks for the receipt of an outbound message, and determines if the received message is an alarm query or alarm acknowledgment.

As shown in the first flow chart 2280, a decision is made whether a new alarm exists (step 2200). If so, the remote node controller assigns itself a randomly selected future alarm alert time slot, such as F in FIG. 22 (step 2202). Selection of this future alert time slot is made with consideration of thermal conditions in the remote transmitter IGBT PWM coils. The DSP controller 2009 takes into account the ambient temperature of the remote transmitter, the heat produced in the coils by each short alarm alert transmission, and the time required to dissipate this heat. If the transmission of an alarm alert would raise the coil temperature above the maximum allowable limit, the controller will select a future time slot (perhaps a few minutes) that will allow a sufficient cool down period in the PWM coils.

When the scheduled time slot arrives (step 2204), the process checks to see if the alarm state has been cleared (by the second routine) (step 2206), and, if not, sends the alarm alert to the substation receiver (step 2208). The routine then selects another alarm slot and repeats the above process until an alarm acknowledgment is received.

The second alarm routine 2290 checks for the receipt of an outbound message (step 2212). When any valid outbound message is detected, such as time slot A in FIG. 22, the routine uses this as a reference time marker, and repositions its alarm time slot identification accordingly (step 2214) to assure proper transceiver synchronization. The routine then determines if the received message is an alarm query or alarm acknowledgment (step 2216). If it is an alarm query, the routine initiates the transmission of a detailed alarm message (step 2218), if this type of alarm mode operation is valid for the particular remote node transceiver. If the message is an alarm acknowledgment (step 2220), the alarm condition is cleared, having been successfully processed by the substation PC 600. If the message was not an alarm type, the controller processes the received message accordingly (step 2222).

Figure 25:
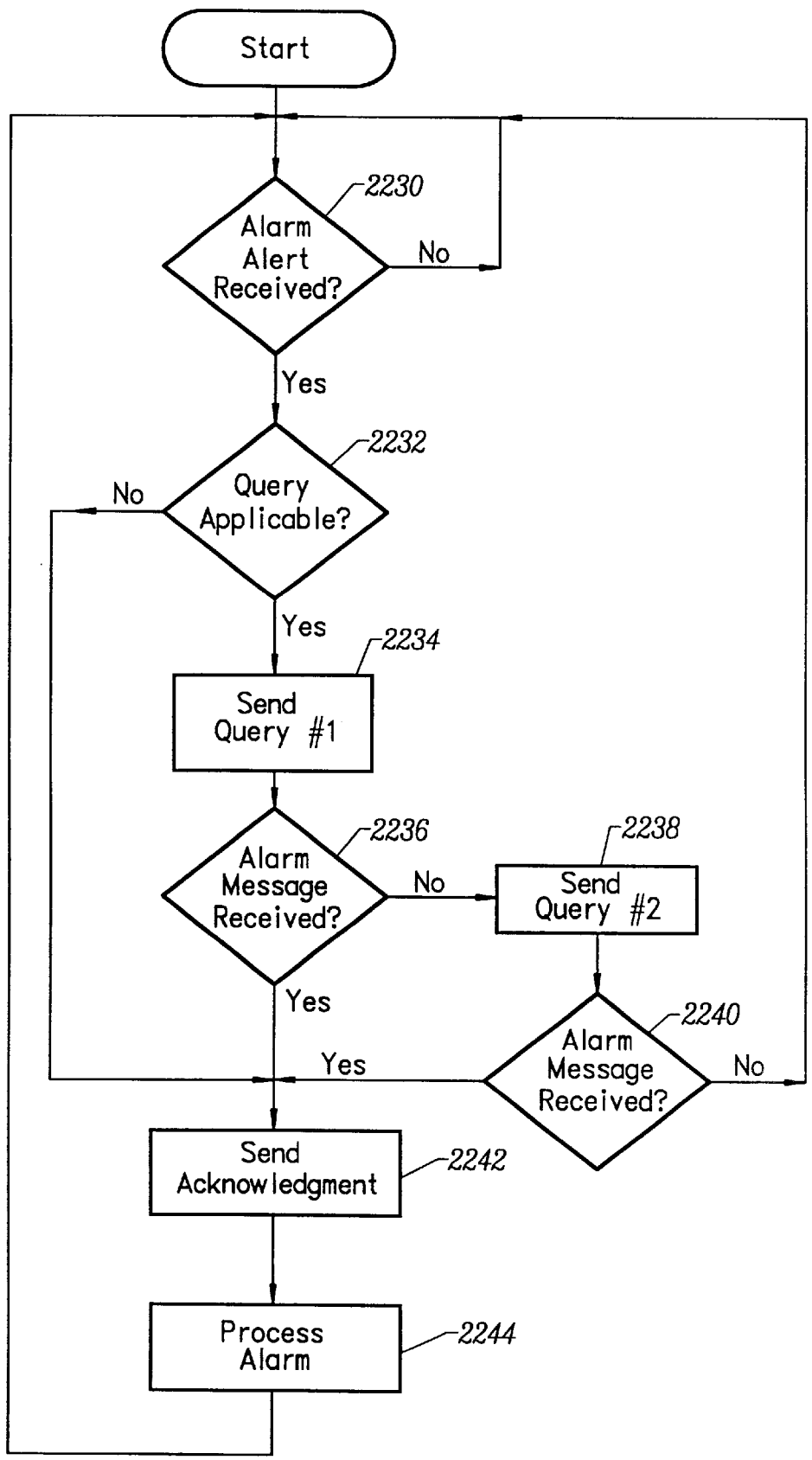
FIG. 25 illustrates substation alarm service processing in accordance with an embodiment of the invention.

FIG. 25 is a flow chart of the substation PC 600 alarm servicing routine. Upon receiving an alarm alert from a remote node transceiver (2230), the substation PC determines if an alarm query is applicable for the particular remote node transceiver (2232). If not applicable, a standard alarm acknowledgment is sent and the PC takes the appropriate action for alarm processing. If an alarm query is required, for a more detailed alarm condition, the PC 600 transmits a first alarm query in time slot D in FIG. 22, to the remote node site (step 2234). If an alarm message response from the remote node is not received (step 2236—no), the substation PC sends a second alarm query (step 2238), time slot G in FIG. 22, to the remote transceiver. If the full length alarm message is now received (step 2240—yes), the substation PC acknowledges (step 2242), and processes the alarm (step 2244). If the alarm message is still not received the substation PC terminates any further query and waits for another inbound alarm alert. At this point the remote node transceiver will continue to send its alarm alert as described above.

The system of the invention accomplishes bi-directional data communications in an existing electric utility distribution system. The distinct and unique methodology employed in this system accomplishes data signal injection into the distribution system, signal propagation through the system, and data signal extraction from the distribution system without requiring the installation of signal repeaters or reactive coupling or blocking devices. This novel feature of the invention is accomplished through unique signal transmission and reception processes such as: utilization of the same frequency spectrum that is occupied by the utility system 60 Hz power frequency and its harmonics; synchronized 60 Hz waveform tracking to allow data transmission through nearly the entire portion of each 60 Hz half cycle; and unique pulse shaping and control techniques for data pulse generation. These processes result in the ability to transmit data at much higher data rates than previously accomplished by other communications systems operating in the electric utility distribution system.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus to establish digital communication over a power line network, comprising:
a signal launching circuit to impose a digital communication signal onto a power signal carried by a power line network and thereby form a digital communication power signal at a first point in said power line network, said signal launching circuit being configured to position a pulse of said digital communication signal at any phase location of each half cycle of said power signal;
a receiver to read said digital communication power signal at a second point in said power line network; and
a signal processor connected to said receiver to recover said digital communication signal from said digital communication power signal.

2. The apparatus of claim 1 wherein said first point is a substation location of said power line network.

3. The apparatus of claim 2 wherein said second point is a distribution location of said power line network.

4. The apparatus of claim 1 wherein said first point is a distribution location of said power line network.

5. The apparatus of claim 4 wherein said second point is a substation location of said power line network.

6. The apparatus of claim 1 further comprising a second receiver at said first point and a second signal launching circuit at said second point so as to establish bi-directional digital communication between said first point and said second point.

7. The apparatus of claim 1 wherein said signal launching circuit imposes a digital communication signal with a data rate in excess of 1000 baud onto said power signal carried by said power line network.

8. The apparatus of claim 1 wherein said signal launching circuit includes a signal injection current transformer.

9. The apparatus of claim 1 wherein said signal launching circuit includes a phase-locked loop to set the relative phase between said digital communication signal and said power signal to a preselected phase.

10. The apparatus of claim 1 wherein said signal launching circuit includes circuitry to respond to variations in said power signal to maintain the amplitude of said digital communication signal within a predefined band.

11. The apparatus of claim 1 wherein said signal launching circuit is configured to produce said digital communication signal at substantially the same frequency spectrum as said power signal and its harmonics.

12. The apparatus of claim 1 wherein said signal launching circuit is configured to maintain the amplitude of said digital communication signal lower than steady state fluctuations in said power signal.

13. The apparatus of claim 1 wherein said signal processor includes a filter with a transfer function representing the inverse of the frequency response of said power line network.

14. A method of establishing digital communication over a power line network, said method comprising the steps of:
imposing a digital communication signal onto a power signal carried by a power line network and thereby forming a digital communication power signal at a first point in said power line network, said imposing step including the step of selectively positioning a pulse of said digital communication signal at any phase location of each half cycle of said power signal; and
recovering, at a second point in said power line network, said digital communication signal from said digital communication power signal.

15. The method of claim 14 further comprising the steps of:
performing said imposing step at said second point; and
executing said recovering step at said first point so as to establish bi-directional digital communication between said first point and said second point.

16. The method of claim 14 wherein said imposing step includes the step of imposing a digital communication signal with a data rate in excess of 1000 baud onto said power signal.

17. The method of claim 14 further comprising the step of responding to variations in said power signal to maintain the amplitude of said digital communication signal within a predefined band.

18. The method of claim 14 wherein said imposing step includes the step of producing said digital communication signal at substantially the same frequency spectrum as said power signal and its harmonics.

19. The method of claim 14 wherein said imposing step includes the step of maintaining the amplitude of said digital communication signal lower than steady state fluctuations in said power signal.

20. The method of claim 14 wherein said recovering step includes the step of filtering said digital communication power signal with a transfer function representing the inverse of the frequency response of said power line network.

* * * * *